US 8,857,157 B2

(12) United States Patent
Hamama et al.

(10) Patent No.: US 8,857,157 B2
(45) Date of Patent: Oct. 14, 2014

(54) TEMPERATURE ESTIMATION SYSTEMS AND METHODS

(75) Inventors: Wajdi B. Hamama, Whitmore Lake, MI (US); Alan Root Lockwood, East Lansing, MI (US); James A. Goodall, Hartland, MI (US); Robert J. Genslak, Macomb, MI (US); Mather El-Jaroudi, Canton, MI (US)

(73) Assignee: GM Global Technology Operations LLC

( * ) Notice: Subject to any disclaimer, the term of this patent is extended or adjusted under 35 U.S.C. 154(b) by 1057 days.

(21) Appl. No.: 12/888,755

(22) Filed: Sep. 23, 2010

(65) Prior Publication Data

US 2012/0047875 A1 Mar. 1, 2012

Related U.S. Application Data

(60) Provisional application No. 61/378,156, filed on Aug. 30, 2010.

(51) Int. Cl.
*F01N 9/00* (2006.01)
*F02D 41/14* (2006.01)
*F02B 37/007* (2006.01)
*F01N 13/00* (2010.01)
*F01N 13/10* (2010.01)

(52) U.S. Cl.
CPC ....... *F02B 37/007* (2013.01); *F01N 2900/0418* (2013.01); *F02D 41/1447* (2013.01); *F01N 2900/1602* (2013.01); *F01N 13/107* (2013.01); *Y02T 10/144* (2013.01); *F02D 2200/0804* (2013.01); *F01N 2900/0601* (2013.01); *F01N 13/009* (2014.06); *Y02T 10/47* (2013.01); *F01N 9/00* (2013.01)
USPC .......................................... 60/285

(58) Field of Classification Search
USPC .................. 60/285, 286, 300, 303
See application file for complete search history.

(56) References Cited

U.S. PATENT DOCUMENTS

| | | | |
|---|---|---|---|
| 4,594,668 A | 6/1986 | Fujawa et al. | |
| 5,050,376 A | 9/1991 | Stiglic et al. | |
| 5,761,902 A | 6/1998 | Usami et al. | |
| 5,931,140 A | 8/1999 | Maloney | |
| 6,226,981 B1 | 5/2001 | Bruch et al. | 60/274 |
| 6,247,311 B1 | 6/2001 | Itoyama et al. | |

(Continued)

FOREIGN PATENT DOCUMENTS

| | | |
|---|---|---|
| DE | 19964013 | 7/2001 |
| DE | 102004009646 A1 | 9/2004 |

(Continued)

OTHER PUBLICATIONS

Office Action dated Dec. 14, 2012 from the German Patent Office for German Patent Application No. 10 2011 110 745.6, 7 pages.

(Continued)

*Primary Examiner* — Kenneth Bomberg
*Assistant Examiner* — Jonathan Matthias

(57) ABSTRACT

A system for a vehicle includes a steady-state (SS) temperature module and a mass temperature module. The SS temperature module generates a SS temperature of a downstream-most catalyst of an exhaust system at a predetermined location between upstream and downstream faces of the downstream-most catalyst. The predetermined location is a predetermined distance upstream from the downstream face. The mass temperature module generates an instantaneous temperature of the downstream-most catalyst at the predetermined location as a function of the SS temperature.

20 Claims, 10 Drawing Sheets

(56) References Cited

U.S. PATENT DOCUMENTS

| | | |
|---|---|---|
| 6,360,541 B2 | 3/2002 | Waszkiewicz et al. |
| 7,848,872 B2 | 12/2010 | Ma et al. ........................ 701/108 |
| 2002/0108603 A1 | 8/2002 | Weinand et al. .............. 123/478 |
| 2003/0101974 A1 | 6/2003 | Wienand et al. .......... 123/568.12 |
| 2004/0230366 A1 | 11/2004 | Ueda et al. |
| 2005/0096833 A1 | 5/2005 | Nakazawa .................... 701/102 |
| 2005/0242760 A1 | 11/2005 | Fujita et al. |
| 2008/0082289 A1 | 4/2008 | Barrillon et al. |
| 2008/0216557 A1 | 9/2008 | Wang et al. .................. 73/23.31 |

FOREIGN PATENT DOCUMENTS

| | | |
|---|---|---|
| DE | 102004043365 | 3/2006 |
| DE | 102006007417 A1 | 8/2007 |
| EP | 1698776 | 9/2006 |

OTHER PUBLICATIONS

U.S. Appl. No. 12/316,022, filed Dec. 9, 2008, Hamama et al.

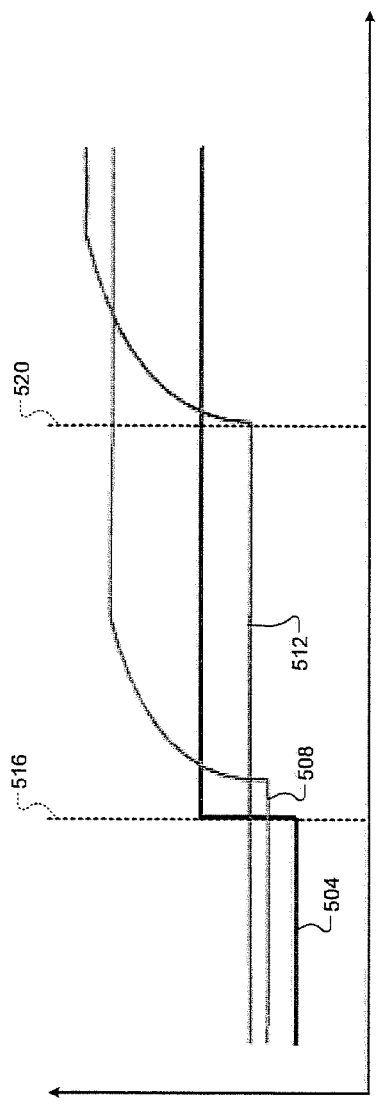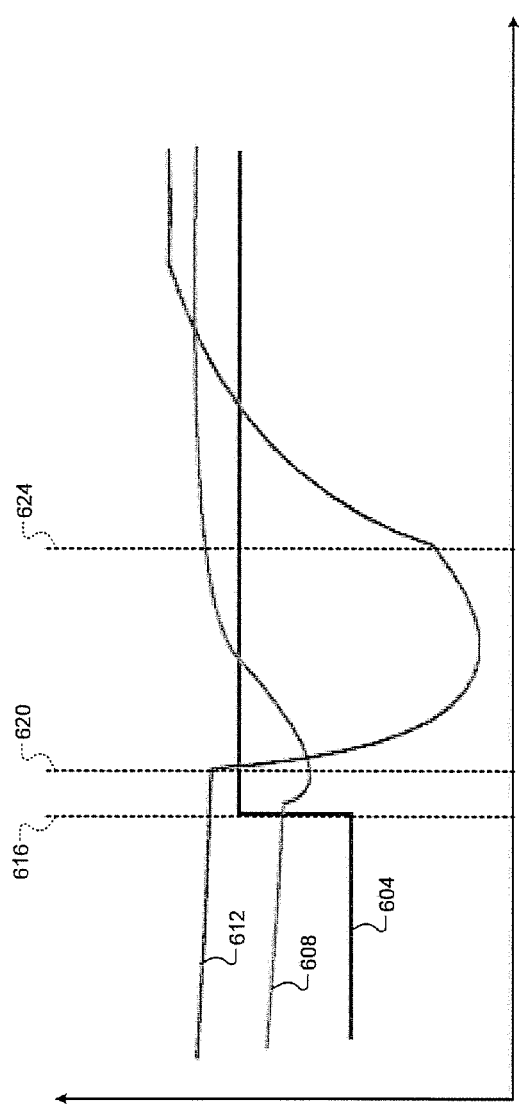

TEMPERATURE ESTIMATION SYSTEMS AND METHODS

CROSS-REFERENCE TO RELATED APPLICATIONS

This application claims the benefit of U.S. Provisional Application No. 61/378,156, filed on Aug. 30, 2010. The disclosure of the above application is incorporated herein by reference in its entirety.

This application is related to U.S. patent application Ser. No. 12/316,022 filed on Dec. 9, 2008. The disclosure of the above application is incorporated herein by reference in its entirety.

FIELD

The present disclosure relates to internal combustion engine systems and more particularly to exhaust catalysts.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine combusts a mixture of air and fuel to produce drive torque and propel a vehicle. Air is drawn into the engine through a throttle valve. Fuel provided by one or more fuel injectors mixes with the air to form the air/fuel mixture. The air/fuel mixture is combusted within one or more cylinders to produce drive torque. An engine control module (ECM) controls the torque output of the engine.

Exhaust gas resulting from combustion of the air/fuel mixture is expelled from the engine to an exhaust system. The ECM may adjust one or more engine parameters based on signals from various sensors that are located in the exhaust system. For example only, one or more temperature sensors and/or exhaust flow rate sensors may be located in the exhaust system. The ECM may adjust, for example, airflow into the engine, the amount of fuel injected, and/or spark timing based on the signals.

The sensors provide the ECM with measurements regarding conditions within the exhaust system and allow the ECM to adjust one or more engine parameters to create desired exhaust conditions. As the number of sensors implemented in the exhaust system increases, however, the cost of producing the vehicle also increases. The increased production cost may be attributable to, for example, the sensors themselves, associated wiring and hardware, and/or research and development. Additionally, a vehicle manufacturer may produce a variety of different vehicles, and each of the different vehicles may have a different exhaust system. Calibrating and adjusting sensors implemented in each different vehicle and exhaust system may also increase vehicle production cost.

SUMMARY

A system for a vehicle includes a steady-state (SS) temperature module and a mass temperature module. The SS temperature module generates a SS temperature of a downstream-most catalyst of an exhaust system at a predetermined location between upstream and downstream faces of the downstream-most catalyst. The predetermined location is a predetermined distance upstream from the downstream face. The mass temperature module generates an instantaneous temperature of the downstream-most catalyst at the predetermined location as a function of the SS temperature.

A method for a vehicle includes generating a steady-state (SS) temperature of a downstream-most catalyst of an exhaust system at a predetermined location between upstream and downstream faces of the downstream-most catalyst and generating an instantaneous temperature of the downstream-most catalyst at the predetermined location as a function of the SS temperature. The predetermined location is a predetermined distance upstream from the downstream face; and Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 5-6 are example graphs of temperatures as functions of time during tip-in events according to the principles of the present disclosure;

DETAILED DESCRIPTION

Figure 1:
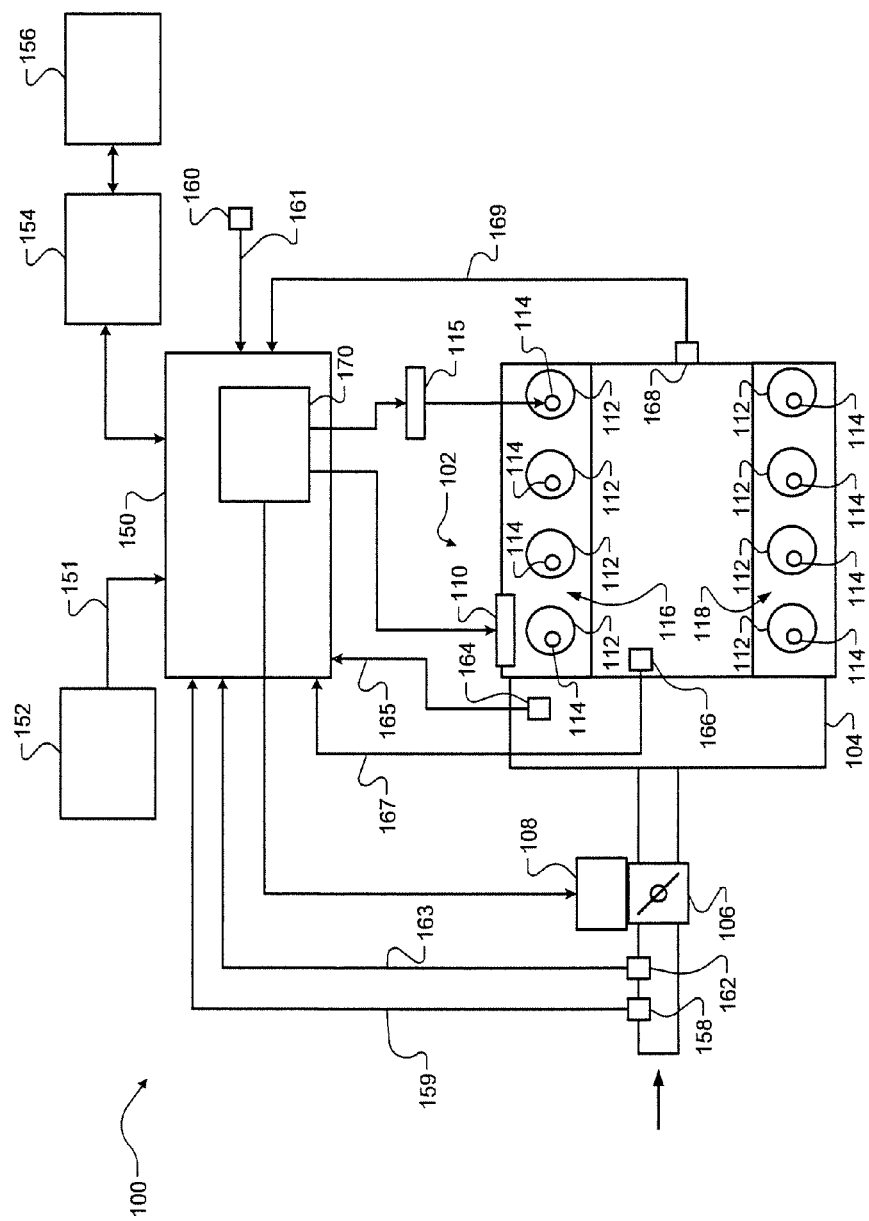
FIG. 1 is a functional block diagram of an example engine system according to the principles of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

An exhaust system of a vehicle includes exhaust system components through which exhaust flows before the exhaust is expelled to ambient air. An exhaust system modeling module estimates an input gas temperature, an output gas temperature, a mass temperature, and a pressure for one or more of the exhaust system components.

The input and output gas temperatures of a given component correspond to temperatures of the exhaust entering and exiting the component, respectively. The mass temperature corresponds to the instantaneous temperature of the material that makes up the component. An engine control module may adjust one or more engine operating parameters based on one or more of the estimated temperatures and/or pressures to achieve one or more desired exhaust system conditions.

The exhaust system modeling module according to the present disclosure also estimates the mass temperature of a downstream-most catalyst of the exhaust system. Specifically, the exhaust system modeling module estimates the mass temperature at a predetermined distance upstream from the downstream face of the downstream-most catalyst. For example only, the predetermined distance may be 1 inch upstream of the downstream face.

Referring now to FIG. 1, a functional block diagram of an example implementation of an engine system 100 is presented. An air/fuel mixture is combusted within an engine 102 to produce drive torque for a vehicle. The engine 102 may be a gasoline-type engine, a diesel-type engine, a hybrid-type engine, and/or another suitable type of engine. The engine 102 may be configured in a V-type configuration, a flat-type configuration, an inline-type configuration, or another suitable type of configuration.

Air is drawn into the engine 102 through an intake manifold 104 and a throttle valve 106. The throttle valve 106 is actuated to control airflow into the engine 102. A throttle actuator module 108 (e.g., an electronic throttle controller or ETC) controls the throttle valve 106.

A fuel system 110 injects fuel that mixes with the air to form the air/fuel mixture. The fuel system 110 may inject the fuel into the intake manifold 104, near intake valves (not shown) associated with cylinders 112 of the engine 102, directly into each of the cylinders 112, and/or at another suitable location. In various implementations, the fuel system 110 includes one fuel injector (not shown) for each of the cylinders 112.

The air/fuel mixture is combusted within the cylinders 112 of the engine 102. Combustion of the air/fuel mixture may be initiated by, for example, spark provided by spark plugs 114. An ignition system 115 may control the spark provided by the spark plugs 114. In some engine systems, such as the engine system 100, one spark plug may be provided for each of the cylinders 112. In other engine systems, such as diesel-type engine systems, combustion may be accomplished without the spark plugs 114. Combustion of the air/fuel mixture generates drive torque and rotatably drives a crankshaft (not shown).

The engine 102 may include eight cylinders as shown in FIG. 1, although the engine 102 may include a greater or fewer number of cylinders. The cylinders 112 of the engine 102 are depicted as being arranged in two cylinder banks: a left cylinder bank 116 and a right cylinder bank 118. Although the engine 102 is shown as including the left and right cylinder banks 116 and 118, the engine 102 may include fewer or more cylinder banks. For example only, inline-type engines may be considered to have cylinders arranged in one cylinder bank.

An engine control module (ECM) 150 controls the torque output of the engine 102. The ECM 150 may control the torque output of the engine 102 based on driver inputs 151 provided by a driver input module 152. For example only, the driver inputs 151 may include an accelerator pedal position.

The ECM 150 may also communicate with a hybrid control module 154 to coordinate operation of the engine 102 and one or more electric motors, such as electric motor (EM) 156. The EM 156 may also function as a generator, and may be used to selectively produce electrical energy for use by vehicle electrical systems and/or for storage in a battery.

The ECM 150 makes control decisions based on parameters measured by various sensors. An intake air temperature (IAT) sensor 158 measures IAT and generates an IAT signal 159 based on the IAT. An ambient air temperature sensor 160 measures ambient air temperature and generates an ambient air temperature signal 161 based on the ambient air temperature. A mass air flow (MAF) sensor 162 measures the mass flow rate of air into engine 102 and generates a MAF signal 163 accordingly. A manifold absolute pressure (MAP) sensor 164 measures pressure within the intake manifold 104 and generates a MAP signal 165 based on the pressure. In various implementations, engine vacuum may be measured, where engine vacuum is determined based on the difference between ambient air pressure and the pressure within the intake manifold 104.

A coolant temperature sensor 166 measures temperature of engine coolant and generates a coolant temperature signal 167 based on the coolant temperature. The coolant temperature sensor 166 may be located within the engine 102 or at other locations where the coolant is circulated, such as a radiator (not shown). An engine speed sensor 168 measures a rotational speed of an output of the engine 102 (e.g., a crankshaft) and generates an engine speed signal 169 based on the speed.

The ECM 150 may include an actuator control module 170 that controls various engine operating parameters. For example only, the actuator control module 170 may adjust throttle opening, amount or timing of fuel injection, spark timing, cylinder deactivation, and/or turbocharger boost. The actuator control module 170 may also control other engine parameters, such as exhaust gas recirculation (EGR) valve opening, and/or opening/closing of intake and exhaust valves (not shown) associated with the cylinders 112 of the engine 102.

Figure 2:
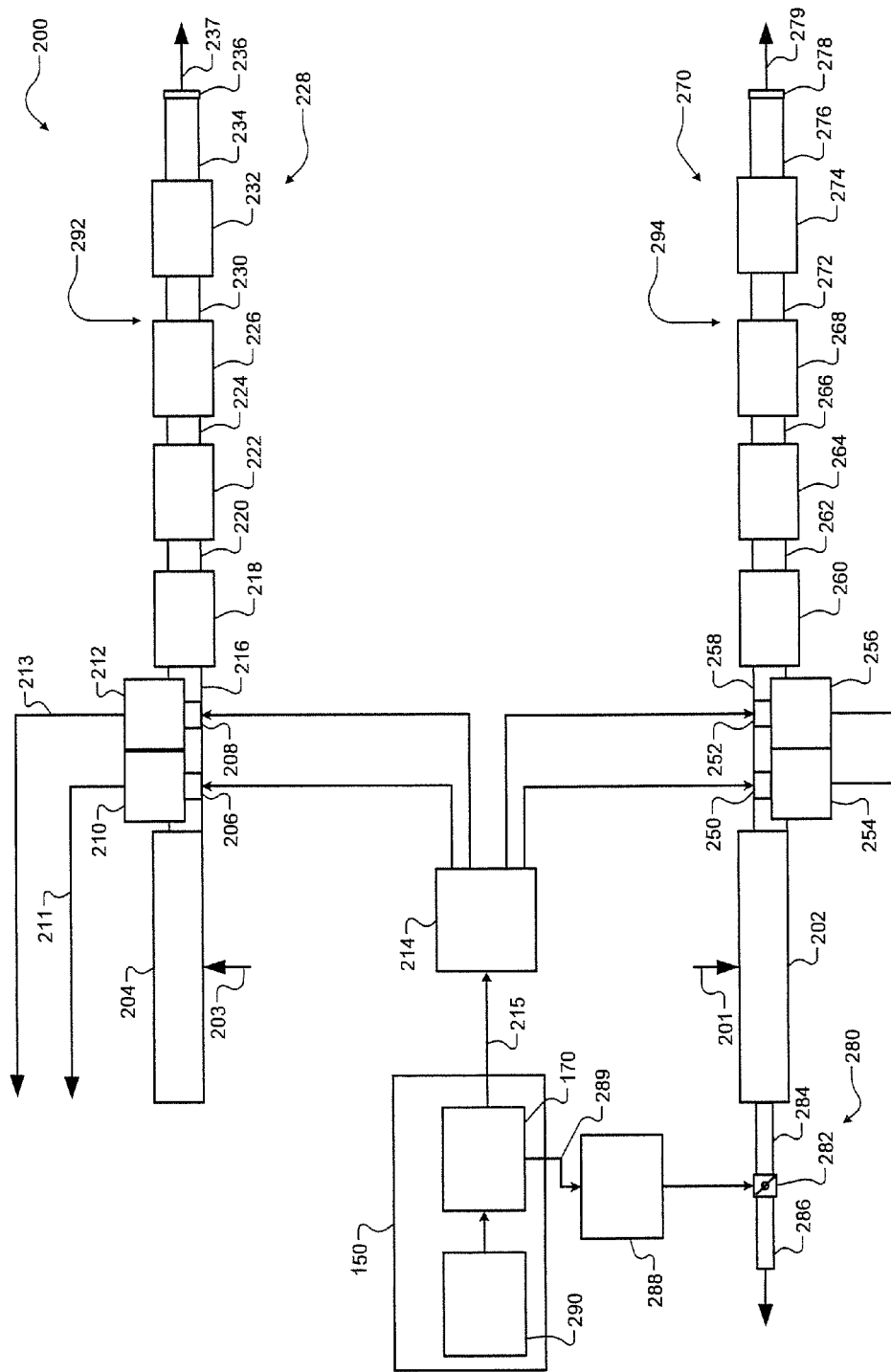
FIG. 2 is a functional block diagram of an example exhaust system according to the principles of the present disclosure.

Referring now to FIG. 2, a functional block diagram of an example exhaust system 200 is presented. The example exhaust system 200 of FIG. 2 is a generic exhaust system that includes a plurality of exhaust system components that can be implemented in one or more different models and types of vehicles. The actual exhaust system implemented in a particular vehicle may be different than the exhaust system 200. While the exhaust system 200 will be described, the present disclosure is applicable to other exhaust system configurations, which may include a fewer or greater number components than the exhaust system 200. Numerals assigned to similar components of the exhaust system 200 are for distinction only, and are not representative of the relative importance of the components.

Exhaust gas resulting from combustion of the air/fuel mixture is expelled from the engine 102 to the exhaust system 200. Exhaust gas 201 is expelled from the cylinders 112 of the right cylinder bank 118 to a right exhaust manifold 202. Exhaust gas 203 is expelled from the cylinders 112 of the left cylinder bank 116 to a left exhaust manifold 204. With respect to the left exhaust manifold 204, the exhaust flows from the left exhaust manifold 204 past a first wastegate 206 and a second wastegate 208. The first and second wastegates 206 and 208 are associated with first and second turbochargers 210 and 212, respectively.

The turbochargers 210 and 212 provide pressurized air 211 and 213, respectively, to the intake manifold 104. The turbochargers 210 and 212 draw in air, pressurize the air, and provide the pressurized air 211 and 213, respectively, to the intake manifold 104. The turbochargers 210 and 212 may draw in air from the intake manifold 104, ambient air, and/or another suitable source. One or more of the turbochargers 210 and 212 may be, for example only, variable geometry turbochargers.

One or more intercoolers (not shown) may also be implemented to dissipate heat from the pressurized air supplied to the intake manifold 104. The temperature of the pressurized air may be increased by, for example, the pressurization of the air and/or proximity to the exhaust system 200.

The turbochargers 210 and 212 are powered by the exhaust gas expelled from the cylinders 112 of the left cylinder bank 116. The wastegates 206 and 208 may allow the exhaust gas to bypass the turbochargers 210 and 212, respectively. In this manner, the wastegates 206 and 208 may be used to reduce the output (i.e., boost) of the turbochargers 210 and 212, respectively.

A boost actuator module 214 controls the output of the turbochargers 210 and 212 based on signals, collectively 215, from the ECM 150. More specifically, the actuator control module 170 may control the output of the turbochargers 210 and 212. For example only, the boost actuator module 214 may modulate the output of the turbochargers 210 and 212 by controlling the positions of the wastegates 206 and 208, respectively. The boost actuator module 214 may control the positions of the wastegates 206 and 208 by controlling the duty cycle (DC) of power applied to the wastegates 206 and 208.

The exhaust from the left cylinder bank 116 may flow from the wastegates 206 and 208, through a first exhaust pipe 216, to a first catalyst 218. Exhaust pipe surface between the left exhaust manifold 204 and the wastegates 206 and 208 and/or between the wastegates 206 and 208 may also be considered as part of the first exhaust pipe 216. The first catalyst 218 may include, for example, a diesel oxidation catalyst (DOC), a selective catalyst reductant (SCR) catalyst, a catalytic converter, and/or another suitable type of exhaust catalyst.

The exhaust from the left cylinder bank 116 may flow from the first catalyst 218, through a second exhaust pipe 220, to a second catalyst 222. The second catalyst 222 may include, for example, a diesel oxidation catalyst (DOC), a selective catalyst reductant (SCR) catalyst, a catalytic converter, and/or another suitable type of exhaust catalyst.

The exhaust from the left cylinder bank 116 may flow from the second catalyst 222, through a third exhaust pipe 224, to a third catalyst 226. The third catalyst 226 may include, for example, a diesel oxidation catalyst (DOC), a selective catalyst reductant (SCR) catalyst, a catalytic converter, and/or another suitable type of exhaust catalyst. One or more of the catalysts may be implemented with another component, such as a diesel particulate filter (DPF).

In various implementations, more than one of the first, second, and third catalysts 218, 222, and 226 may be combined and implemented as a multi-stage catalyst. For example only, the first and second catalysts 218 and 222 may be implemented as a dual-stage catalyst. In other implementations, the second and third catalysts 222 and 226 may be implemented as a dual-stage catalyst, or the first, second, and third catalysts 218, 222, and 226 may all be implemented as a three-stage catalyst. A most downstream one of the first, second, and third catalysts 218, 222, and 226 is referred to as a rear catalyst. For example only, the third catalyst 226 is referred to as a rear catalyst.

The exhaust from the left cylinder bank 116 may flow from the third catalyst 226 to a first muffler/tailpipe system 228. For example only, the first muffler/tailpipe system 228 may include a fourth exhaust pipe 230, a first muffler 232, a fifth exhaust pipe 234, and a first flapper valve 236. The exhaust may flow from the third catalyst 226, through the fourth exhaust pipe 230, to the first muffler 232.

The first muffler 232 dampens acoustic noise produced by the cylinders 112 of the left cylinder bank 116. The exhaust may flow from the first muffler 232, through the fifth exhaust pipe 234, to the first flapper valve 236. The first flapper valve 236 may increase pressure within the exhaust system 200, prevent external objects from entering the exhaust system 200, and/or perform one or more other functions. Exhaust 237 exits the exhaust system 200 past the first flapper valve 236.

The exhaust from the cylinders 112 of the right cylinder bank 118 may take a path similar to that of the exhaust from the cylinders 112 of the left cylinder bank 116, as described above. For example, the exhaust gas 201 expelled from the cylinders 112 of the right cylinder bank 118 may flow from the right exhaust manifold 202 through a third wastegate 250 and a fourth wastegate 252.

The wastegates 250 and 252 are associated with third and fourth turbochargers 254 and 256, respectively. The wastegates 250 and 252 and the turbochargers 254 and 256 may be similar or identical to the wastegates 206 and 208 and the turbochargers 210 and 212, respectively. The boost actuator module 214 may control the wastegates 250 and 252 based on the signals 215 from the actuator control module 170. In this manner, the boost actuator module 214 controls the boost of the turbochargers 254 and 256.

The exhaust from the right cylinder bank 118 may flow from the wastegates 250 and 252, through a sixth exhaust pipe 258, to a fourth catalyst 260. Exhaust pipe surface between the right exhaust manifold 202 and the wastegates 250 and 252 and/or between the wastegates 250 and 252 may also be considered as part of the sixth exhaust pipe 258. The fourth catalyst 260 may include, for example, a diesel oxidation catalyst (DOC), a selective catalyst reductant (SCR) catalyst, a catalytic converter, and/or another suitable type of exhaust catalyst.

The exhaust from the right cylinder bank 118 may flow from the fourth catalyst 260, through a seventh exhaust pipe 262, to a fifth catalyst 264. The fifth catalyst 264 may include, for example, a diesel oxidation catalyst (DOC), a selective catalyst reductant (SCR) catalyst, a catalytic converter, and/or another suitable type of exhaust catalyst.

The exhaust from the right cylinder bank 118 may flow from the fifth catalyst 264, through an eight exhaust pipe 266, to a sixth catalyst 268. The sixth catalyst 268 may include, for example, a diesel oxidation catalyst (DOC), a selective catalyst reductant (SCR) catalyst, a catalytic converter, and/or another suitable type of exhaust catalyst. One or more of the catalysts may be implemented with another component, such as a diesel particulate filter (DPF).

In various implementations, more than one of the fourth, fifth, and sixth catalysts 260, 264, and 268 may be combined and implemented as a multi-stage catalyst. For example only, the fourth and fifth catalysts 260 and 264 may be implemented as a dual-stage catalyst. In other implementations, the fifth and sixth catalysts 264 and 268 may be implemented as a dual-stage catalyst, or the fourth, fifth, and sixth catalysts 260, 264, and 268 may all be implemented as a three-stage catalyst. A most downstream one of the fourth, fifth, and sixth catalysts 260, 264, and 268 is also referred to as a rear catalyst. For example only, the sixth catalyst 268 is referred to as a rear catalyst.

The exhaust from the right cylinder bank 118 may flow from the sixth catalyst 268 to a second muffler/tailpipe system 270. For example only, the second muffler/tailpipe system 270 may include a ninth exhaust pipe 272, a second muffler 274, a tenth exhaust pipe 276, and a second flapper valve 278. The exhaust may flow from the sixth catalyst 268, through the ninth exhaust pipe 272, to the second muffler 274.

The second muffler 274 dampens acoustic noise produced by the cylinders 112 of the right cylinder bank 118. The exhaust may flow from the second muffler 274, through the tenth exhaust pipe 276, to the second flapper valve 278. The second flapper valve 278 may increase pressure within the exhaust system 200, prevent external objects from entering the exhaust system 200, and/or perform other functions. Exhaust 279 may exit the exhaust system 200 past the second flapper valve 278.

An exhaust gas recirculation (EGR) system 280 may also be associated with the left exhaust manifold 204 and/or the right exhaust manifold 202. For example only, the EGR system 280 may be associated with the right exhaust manifold 202, as shown in FIG. 2. An EGR system may additionally or alternatively be associated with the left exhaust manifold 204. The EGR system 280 includes an EGR valve 282, a first EGR pipe 284, and a second EGR pipe 286.

The EGR valve 282 is linked to the right exhaust manifold 202 via the first EGR pipe 284. The EGR valve 282 selectively redirects exhaust gas from the right exhaust manifold 202 back to the intake manifold 104 via the second EGR pipe 286. An EGR actuator module 288 controls actuation of the EGR valve 282 based on signals 289 from the ECM 150. In this manner, the ECM 150 controls exhaust gas flowrate (EGF) through the EGR system 280.

The ECM 150 includes an exhaust system module 290 that is initially configured based on the exhaust system 200 of FIG. 2. While the exhaust system module 290 and the actuator control module 170 are shown and discussed as being located within the ECM 150, the exhaust system module 290 and/or the actuator control module 170 may be located in another suitable location, such as external to the ECM 150. The exhaust system module 290 receives data that indicates the configuration of an actual exhaust system implemented in the vehicle (not shown in FIG. 2) and re-configures accordingly.

The exhaust system module 290 estimates an input gas temperature, an output gas temperature, a mass temperature, and a pressure for each component of the actual exhaust system. The actuator control module 170 may selectively adjust one or more engine operating parameters based on the input gas temperature, output gas temperature, mass temperature, and/or pressure of one or more of the exhaust system components. The actuator control module 170 may use the temperatures and/or pressure estimated by the exhaust system module 290, for example, to create one or more desired exhaust system conditions.

Figure 3:
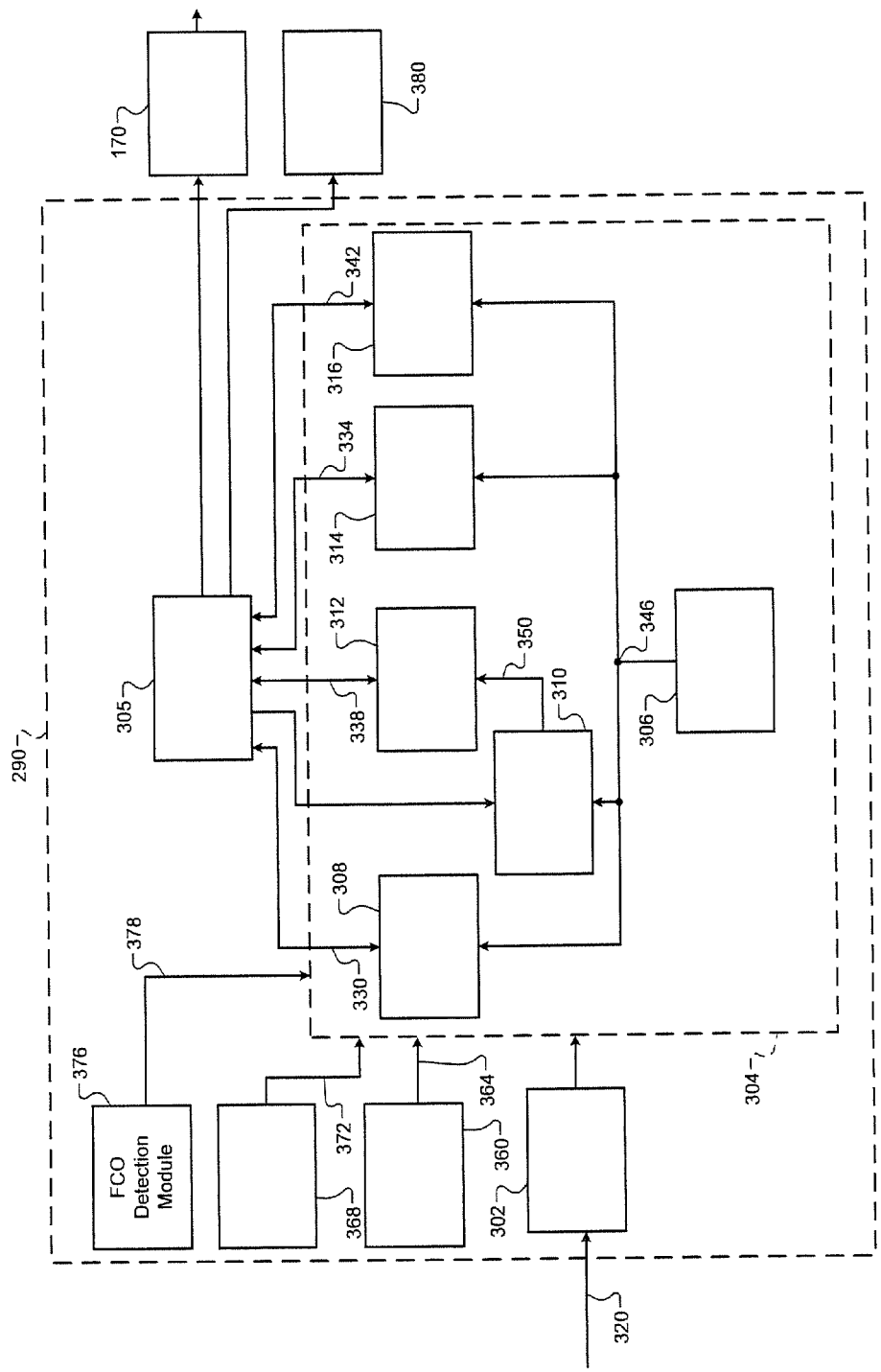
FIG. 3 is a functional block diagram of an exhaust system module according to the principles of the present disclosure.

Referring now to FIG. 3, a functional block diagram of an example implementation of the exhaust system module 290 is presented. The exhaust system module 290 includes a configuration module 302, an exhaust system modeling module 304, and a storage module 305. The exhaust system modeling module 304 includes an exhaust gas flowrate (EGF) determination module 306, an input temperature module 308, a steady-state (SS) temperature module 310, a mass temperature module 312, an output temperature module 314, and a pressure determination module 316.

The exhaust system modeling module 304 is initially configured based on the exhaust system 200 of FIG. 2. In other words, the exhaust system modeling module 304 is initially configured based on a generic exhaust system that is applicable to a variety of models and types of engine systems and vehicles, such as the example exhaust system 200.

The configuration module 302 receives actual configuration data 320 indicative of an actual exhaust system configuration of the vehicle in which the exhaust system module 290 is implemented. If the actual exhaust system configuration differs from the configuration of the exhaust system 200, the configuration module 302 re-configures the exhaust system modeling module 304 based on the actual exhaust system configuration. Re-configuration may include, for example, enabling and disabling components of the generic configuration based on the actual configuration data 320 and/or re-configuring parameters of an enabled component based on the actual configuration data 320. The configuration module 302 may receive the actual configuration data 320 from a suitable source, such as memory or a device used to calibrate the vehicle.

The exhaust system modeling module 304 estimates a pressure and one or more temperatures for each component of the actual exhaust system. More specifically, the exhaust system modeling module 304 models an input temperature 330, an output temperature 334, a mass temperature 338, and a pressure 342 for each exhaust system component through which exhaust gas flows. The input and output temperatures 330 and 334 of a given component correspond to the temperature of the exhaust gas input to and output from the component, respectively. The mass temperature 338 of the component corresponds to the instantaneous temperature of the material(s) that makes up the component itself.

The exhaust system modeling module 304 stores the temperatures and pressure for each component of the exhaust system in the storage module 305. The storage module 305 may be implemented, for example, in memory.

The EGF determination module 306 determines an EGF 346 for each component of the exhaust system. The EGF 346 of a given component may be expressed as a percentage based on an EGF through the component relative to a maximum EGF that the associated engine is capable of producing. For example only, the EGF 346 for a given component may be determined using the equation:

$$EGF_{REL} = \frac{EGF}{EGF_{MAX}}, \quad (1)$$

where $EGF_{REL}$ is the EGF 346 for the component, EGF through the component, and $EGF_{MAX}$ is the maximum EGF. The maximum EGF may be a predetermined value in various implementations.

The EGF determination module 306 may determine the EGF through a given component based on various inputs. For example only, the EGF through a given component may be determined based on the coolant temperature, ethanol concentration of the fuel injected, spark timing, equivalence ratio, vehicle speed, ambient air temperature, IAT, and the accelerator position. The EGF through a given component may also be determined based on the EGR flowrate, MAF, air-per-cylinder (APC), ambient air pressure, engine speed, flapper valve position(s), and/or the waste gate duty cycles.

The EGF determination module 306 may also determine the EGF through a given component based on the mode of operation of the engine. For example only, the EGF through a given component may be determined based on whether one or more of the cylinders 112 are deactivated, whether the engine 102 is idling, whether the engine is running or shut down (e.g., hybrid applications), and/or whether the fuel for each firing event is being injected in one or more pulses (e.g., two pulses).

If one or more cylinders are deactivated, the EGF through a given component for the component may be determined based on the number of deactivated and/or activated cylinders. The EGF through a given component may be determined based on the period of time that the engine has been shut down (i.e., OFF) while the engine is shut down. The EGF determination module 306 may also determine the EGF through a given component based on various exhaust system modes, such as whether air is being injected into the exhaust system (e.g., by an auxiliary air pump), whether catalyst warmup is occurring, and/or whether light-off is occurring within one or more catalysts of the exhaust system.

The EGF determination module 306 may also determine the EGF through a given component based on the actual configuration of the exhaust system and/or characteristics of the various components. For example only, the exhaust system may be configured as to bring together the exhaust gas from the right and left exhaust manifolds 202 and 204 at a confluence point (not shown) located directly downstream of two components. The EGF determination module 306 may sum the two EGFs through the components to determine the EGF downstream of the confluence point. Characteristics of a given component that may affect the EGF through that component may include, for example, curvature, cross sectional area, and/or one or more other characteristics.

The input temperature module 308 estimates the input temperature 330 (i.e., input gas temperature) for each of the components of the actual exhaust system. The input temperature module 308 stores the input temperatures 330 in the storage module 305. The input temperature module 308 may set the input temperature 330 for a component based on the output temperature of the preceding (i.e., upstream) component of the exhaust system. For example only, the input temperature module 308 may set the input temperature 330 for an N-th component of the exhaust system equal to the output temperature 334 of an N−1-th component of the exhaust system. N is an integer greater than zero and less than or equal to a total number of components of the actual exhaust system.

For a first component of the actual exhaust system, such as an exhaust manifold (e.g., the right and left exhaust manifolds 202 and 204), the input temperature module 308 may set the input temperature 330 based on an engine output temperature. The input temperature module 308 may determine the engine output temperature based on various parameters, such as engine load, the APC, the engine speed, the spark timing, the equivalence ratio, the ethanol concentration of the fuel, the vehicle speed, and/or the warmup state of the engine. The EGF 346 into the first component may be indicative of the engine load in various implementations.

When the exhaust system includes an EGR system (e.g., the EGR system 280), the input temperature module 308 determines the input temperature 330 for the EGR system based on a temperature of the exhaust gas at the point where the EGR system connects to the associated exhaust manifold. The input temperature module 308 may also determine the input temperature 330 for each component of the EGR system (e.g., the two EGR lines and/or the EGR valve).

The SS temperature module 310 estimates the SS temperature 350 for each component of the actual exhaust system. The SS temperature 350 for a given component corresponds to a temperature that the component itself will reach if the engine load conditions remain constant (i.e., steady state) for a period of time. The SS temperature module 310 determines the SS temperature 350 for the component based on the input temperature 330 of the component, the ambient temperature, and a SS coefficient determined for the component.

The SS temperature module 310 determines the SS coefficient for the component based on the EGF 346 for the component. For example only, the SS temperature module 310 may determine the SS temperature 350 for the component using the equation:

$$T_{SS} = T_A + (T_{IN} - T_A) * C_{SS}, \quad (2)$$

where $T_{SS}$ is the SS temperature 350 of the component, $T_{IN}$ is the input temperature 330 of the component, $T_A$ is the ambient air temperature, and $C_{SS}$ is the SS coefficient for the component.

The mass temperature module 312 determines the mass temperature 338 for each component of the actual exhaust system. The mass temperature module 312 stores the mass temperatures 338 in the storage module 305 by component. The mass temperature module 312 determines the mass temperature 338 for a given component based on the SS temperature 350 of the component and a mass coefficient determined for the component. The mass temperature 338 corresponds to the instantaneous temperature of the component itself (e.g., the metal and/or other material that make up the component).

The mass temperature module 312 determines the mass coefficient for the component based on the EGF 346 determined for the component. The mass coefficient corresponds to the rate at which the mass temperature 338 can change toward the SS temperature 350 of the component. For example only, the mass coefficient may increase as the EGF 346 of the component decreases and vice versa.

The mass temperature module 312 may determine the mass temperature 338 for the component based on, for example, a product of the SS temperature 350 of the component and the mass coefficient. For example only, the mass temperature module 312 may determine the mass temperature 338 for the component using the equation:

$$T_M = T_{Last} + (T_{SS} - T_{Last}) * C_M, \quad (3)$$

where $T_M$ is the mass temperature 338 of the component for a present control loop, $T_{SS}$ is the SS temperature of the component, $T_{Last}$ is the mass temperature 338 of the component from a last control loop, and $C_M$ is the mass coefficient for the component.

The mass temperature module 312 determines the mass coefficient for a turbocharger (e.g., the turbochargers 210, 212, 254, and/or 256) based on the EGF 346 for the turbocharger and the DC of power applied to the associated wastegate. For example only, the mass temperature module 312 may determine the mass coefficient for the turbocharger 212 based on the EGF 346 for the turbocharger 212 and the DC of power applied to the wastegate 206.

The output temperature module 314 determines the output temperature 334 (i.e., an output gas temperature) for each component of the actual exhaust system. The output temperature module 314 stores the output temperatures 334 in the storage module 305.

The output temperature module 314 estimates the output temperature 334 for a given component based on the input temperature 330 for the component, the mass temperature 338 of the component, and an output coefficient for the component. The output temperature module 314 determines the output temperature 334 for the component based on the input temperature 330 of the component plus or minus the change in temperature attributable to heat transfer between the component and air passing the component. More specifically, the output temperature module 314 determines the output temperature by adjusting the input temperature 330 toward the mass temperature 338 based on the output coefficient.

The output temperature module 314 determines the output coefficient for the component based on the EGF 346 of the component. For example only, the output temperature module 314 may estimate the output temperature 334 for the component using the equation:

$$T_{OUT} = T_{IN} + (T_{IN} - T_{MASS}) * C_{OUT}, \quad (4)$$

where $T_{OUT}$ is the output temperature 334 of the component, $T_{IN}$ is the input temperature 330 of the component, $T_{MASS}$ is the mass temperature 338 of the component, and $C_{OUT}$ is the output coefficient of the component.

Catalysts of the exhaust system, such as the catalysts 218, 222, 226, 260, 264, and 268 may produce heat. Accordingly, the output temperature module 314 selectively increases the output temperature of a catalyst of the exhaust system based on the heat generated by the catalyst. The SS temperature module 310 and the mass temperature module 312 may also increase the SS temperature 350 and the mass temperature 338 of the catalyst, respectively, based on the heat generated by the catalyst.

The amount of heat generated by the catalyst will be referred to as a heat generation term. The heat generation term for the catalyst may be determined based on the EGF 346 of the catalyst, the equivalence ratio, and/or the ethanol concentration of the fuel. For example only, when the equivalence ratio is 1.0 (i.e., when a stoichiometric air/fuel mixture is being combusted), the heat generation term may be negligible. The heat generation term for the catalyst may also be determined based on whether air is being supplied into the whether air is being injected into the exhaust system (e.g., by an auxiliary air pump) and/or whether the fuel for each firing event is being injected in one or more pulses (e.g., two pulses).

The output temperature module 314 determines the output coefficient for a turbocharger (e.g., the turbochargers 210, 212, 254, and/or 256) based on the EGF 346 for the turbocharger and the DC of power applied to the associated wastegate. The output temperature module 314 determines the output coefficient for the turbocharger 212 based on the EGF 346 for the turbocharger 212 and the DC of power applied to the wastegate 206. For example only, the output temperature module 314 may determine the output temperature 334 for the turbocharger using the equation:

$$T_{OUT-T} = T_{IN-T} + C_{OUT-T} * (T_{M-T} - T_{IN-T}), \quad (5)$$

where $T_{OUT-T}$ is the output temperature 334 of the turbocharger, $T_{IN-T}$ is the input temperature 330 for the turbocharger, $C_{OUT-T}$ is the output coefficient for the turbocharger, and $T_{M-T}$ is the mass temperature 338 for the turbocharger.

The pressure determination module 316 determines the pressure 342 for each of the exhaust system components. The pressure determination module 316 stores the pressures 342 in the storage module 305. The pressure determination module 316 starts from the ambient air pressure (i.e., barometric pressure) and determines the pressure 342 for a last component of the actual exhaust system. The last component corresponds to the last component that the exhaust gas passes through before being expelled from the exhaust system.

The pressure determination module 316 may determine the pressure 342 for a given component based on a pressure increase(s) for each successive component of the exhaust system moving upstream, toward the first component of the exhaust system. In this manner, the pressure 342 of the first component (e.g., the exhaust manifold) will be a greatest pressure. For example only, the last component of the exhaust system may include a muffler/tailpipe system, such as one of the muffler/tailpipe systems 228 or 270. The pressure determination module 316 may determine the pressure 342 for the muffler/tailpipe systems 228 and 270, then the pressure 342 of the exhaust pipes 230 and 272, then the pressure 342 of the catalysts 226 and 268, etc.

The pressure determination module 316 determines the pressure increase for a component based on the EGF 346 of the component. The pressure determination module 316 may also determine the pressure increase for the component based on the EGF 346 of attached components, and/or characteristics of the component, such as curvature and/or changes in cross-sectional area of the component. For muffler/tailpipe systems (e.g., the muffler tailpipe systems 228 and 280) the pressure determination module 316 determines the pressure increase based on the EGF 346 for the muffler/tailpipe system and the position of an associated flapper valve (if present). The pressure determination module 316 may set the pressure 342 for a given component equal to a sum of the pressure increase for the component and the pressure 342 of a previous (i.e., immediately downstream) component.

The pressure determination module 316 determines the pressure increase for a turbocharger (e.g., the turbochargers 210, 212, 254, and 256) based on the EGF for the turbocharger and the DC of power applied to the associated wastegate. For example only, the pressure determination module 316 determines the pressure increase for the turbocharger 210 based on the EGF for the turbocharger 210 and the DC of power applied to the wastegate 206.

The pressure determination module 316 determines the pressure 342 for an EGR system (e.g., the EGR system 280)

based on an EGR flowrate. The EGR flowrate may be expressed as a percentage, relative to a maximum EGR flowrate. The maximum EGR flowrate may be a calibrated value and may be retrieved from memory. The EGR flowrate may be determined based on the EGR position, the MAP, and/or the pressure of the associated manifolds.

The SS temperature module 310 also estimates the SS temperature 350 for a rear (i.e., downstream-most) catalyst at a location that is between an upstream-most face of the rear catalyst and a downstream-most face of the rear catalyst. For example only, the SS temperature module 310 may estimate the SS temperature 350 at a predetermined distance upstream from a downstream-most face 292 of the third catalyst 226. Additionally or alternatively, the SS temperature module 310 may estimate the SS temperature 350 at the predetermined distance upstream from a downstream-most face 294 of the sixth catalyst 268. For example only, the predetermined distance may be 1 inch upstream from the downstream-most face of the rear catalyst. Hereafter, the SS temperature 350 of the rear catalyst at the predetermined distance from the downstream-most face of the rear catalyst will be referred to as the SS temperature 350 of the rear catalyst.

Generally, the SS temperature module 310 estimates the SS temperature 350 of the rear catalyst using equation (2), as described above. The SS temperature module 310 of the present disclosure adjusts the SS temperature 350 of the rear catalyst under some circumstances, such as during tip-in events, tip-out events, and/or fuel cutoff (FCO) events. For example only, the SS temperature module 310 selectively freezes the SS temperature 350 and/or applies one or more offsets to the SS temperature 350 of the rear catalyst when during a tip-in event, a tip-out event, and/or a FCO event.

The mass temperature module 312 also estimates the mass temperature 338 for a rear catalyst at the location between the upstream-most face of the rear catalyst and the downstream-most face of the rear catalyst. More specifically, the mass temperature module 312 estimates the mass temperature 338 for the rear catalyst at the predetermined distance upstream from the downstream-most face of the rear catalyst. Hereafter, the mass temperature 338 of the rear catalyst at the predetermined distance from the downstream-most face of the rear catalyst will be referred to as the mass temperature 338 of the rear catalyst.

The mass temperature module 312 generally estimates the mass temperature 338 of the rear catalyst using equation (3). The mass temperature module 312 may selectively freeze and/or adjust the mass coefficient under some circumstances, such as during a tip-in event, tip-out event, and/or a fuel cutoff (FCO) event.

The output temperature module 314 estimates the output temperature 334 for a rear catalyst at the location between the upstream-most face of the rear catalyst and the downstream-most face of the rear catalyst. More specifically, the output temperature module 314 estimates the output temperature 334 for the rear catalyst at the predetermined distance upstream from the downstream-most face of the rear catalyst. Hereafter, the output temperature 334 of the rear catalyst at the predetermined distance from the downstream-most face of the rear catalyst will be referred to as the output temperature 334 of the rear catalyst. The output temperature module 314 estimates the output temperature 334 of the rear catalyst based on the input temperature 330 for the rear catalyst, the mass temperature 338 of the rear catalyst, and an output coefficient for the rear catalyst. The output temperature module 314 may estimate the output temperature 334 of the rear catalyst using equation (4). The output temperature module 314 may also estimate the output temperature 334 of the rear catalyst using a heat generation term for the rear catalyst.

A tip-in detection module 360 may indicate whether a tip-in event is occurring based on the engine load. In various implementations, the EGF 346 into the first component of the exhaust system may be indicative of the engine load. The tip-in detection module 360 may indicate whether a tip-in event is occurring based on a change in the EGF 346 of the first component. For example only, the tip-in detection module 360 may indicate that a tip-in event is occurring when a change in the EGF 346 of the first component is greater than a first predetermined change. The first predetermined change may be calibrated and may be set to approximately, for example, 1.0% over 0.5 seconds (s). The tip-in detection module 360 generates a tip-in signal 364 that indicates whether a tip-in event is occurring.

A tip-out detection module 368 may indicate whether a tip-out event is occurring based on the engine load. The EGF 346 into the first component of the exhaust system may again be used as an indicator of the engine load. The tip-out detection module 368 may indicate that a tip-out event is occurring based on the change in the EGF 346 of the first component. For example only, the tip-out detection module 368 may indicate that a tip-out event is occurring when the change in the EGF 346 of the first component is less than a second predetermined change. The second predetermined change may be calibrated and may be set to approximately, for example, −1.0% over 0.5 s. The tip-out detection module 368 generates a tip-out signal 372 that indicates whether a tip-out event is occurring.

A FCO detection module 376 indicates whether a FCO event is occurring. The FCO detection module 376 indicates that an FCO event is occurring when no fuel is being delivered to the engine. The FCO detection module 376 indicates that an FCO event is not occurring when fuel is provided to one or more cylinders of the engine. The FCO detection module 376 generates an EGO signal 378 that indicates whether an FCO event is occurring.

The actuator control module 170 selectively adjusts one or more engine operating parameters based on the parameters stored in the storage module 305. More specifically, the actuator control module 170 selectively adjusts one or more engine parameters based on the temperatures and/or pressure of one or more of the components of the actual exhaust system. For example only, the actuator control module 170 may adjust the amount of fuel injected, airflow into the engine 102, and/or the spark timing based on one or more of the pressures and/or temperatures stored in the storage module 305.

The ECM 150 may also include a diagnostic module 380. The diagnostic module 380 may use the mass temperature 338 of the rear catalyst, the SS temperature 350 of the rear catalyst, and/or the output temperature 334 of the rear catalyst in diagnosing whether one or more faults are present. For example only, the diagnostic module 380 may determine an average temperature based on the mass temperature 338 of the rear catalyst and the SS temperature 350 of the rear catalyst. The diagnostic module 380 may determine the whether to perform a diagnosis of whether a fault is present in an oxygen sensor (not shown) located downstream of the rear catalyst based on the average temperature. The diagnostic module 380 may also determine whether to perform a diagnosis of whether a fault is present in the rear catalyst or a catalyst including the rear catalyst based on the average temperature. In diagnosing whether the fault is present in the rear catalyst or the catalyst including the rear catalyst, the diagnostic module 380 may determine a threshold temperature based on the mass temperature 338 of the rear catalyst. The diagnostic module 380 may diagnose the presence of the fault when the mass temperature 338 of the rear catalyst is greater than the threshold temperature. The diagnostic module 380 may perform one or more remedial actions when a fault is diagnosed. For example only, the diagnostic module 380 may illuminate a malfunction indicator lamp (MIL), set a predetermined code in memory, and/or perform one or more other remedial actions.

Figure 4:
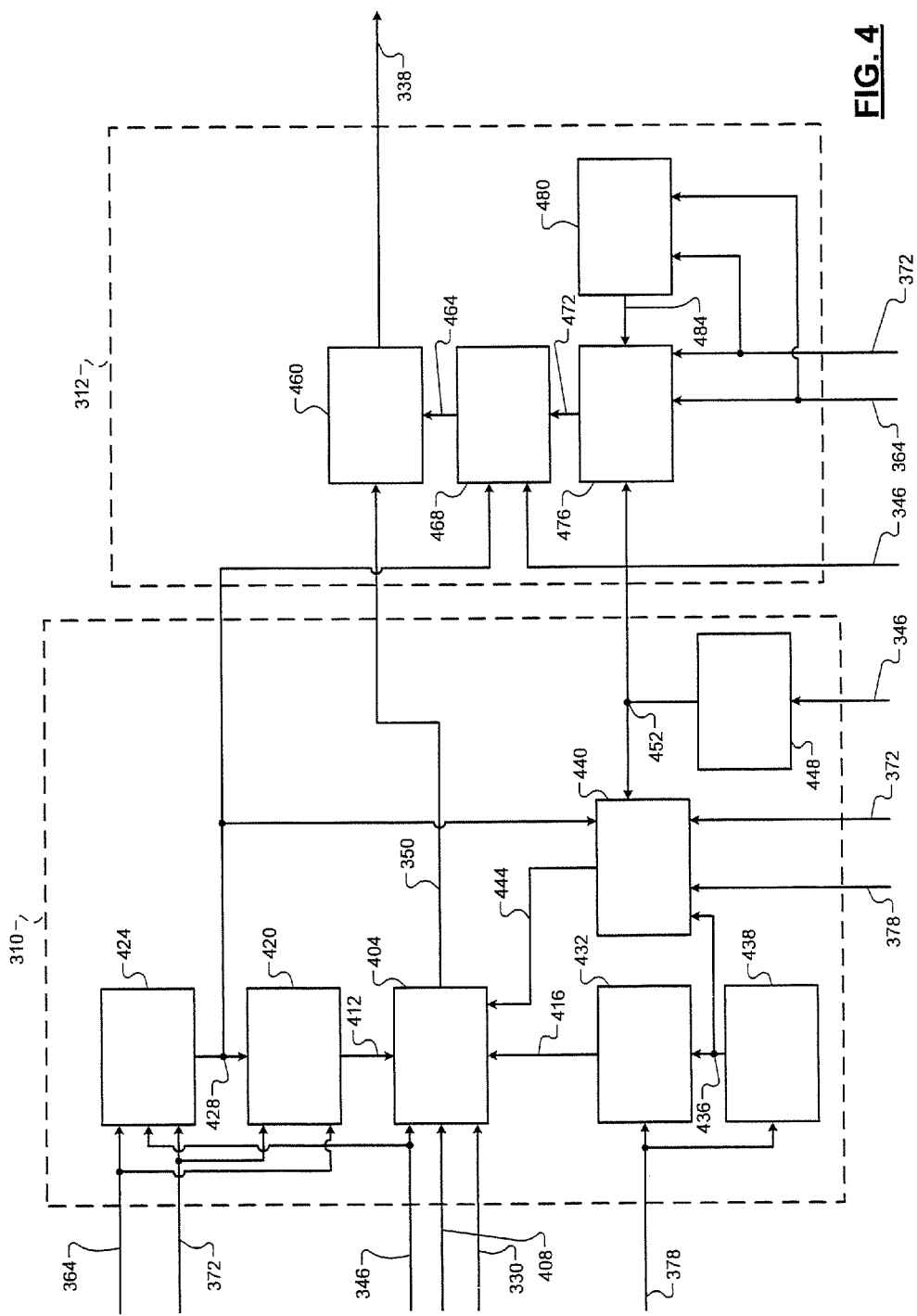
FIG. 4 is an example illustration of stored temperatures and pressures of each component of an exhaust system according to the principles of the present application.

Referring now to FIG. 4, a functional block diagram of example implementations of the SS temperature module 310 and the mass temperature module 312 is presented. The SS temperature module 310 and the mass temperature module 312 determine the SS and mass temperatures 350 and 338 of the rear catalyst, respectively.

An SS temperature estimation module 404 estimates the SS temperature 350 of the rear catalyst. The SS temperature estimation module 404 estimates the SS temperature 350 of the rear catalyst based on the EGF 346 of the rear catalyst, the input temperature 330 of the rear catalyst, and the ambient air temperature 408 measured using the ambient air temperature sensor 160. The SS temperature estimation module 404 may estimate the SS temperature 350 of the rear catalyst using equation (2), as described above.

The SS temperature estimation module 404 selectively freezes (i.e., maintains) the SS temperature 350 of the rear catalyst when at least one of a first freeze signal 412 and a second freeze signal 416 is generated. For example only, the SS temperature estimation module 404 may freeze the SS temperature 350 of the rear catalyst when the first freeze signal 412 and/or the second freeze signal 416 is in an active state. The SS temperature estimation module 404 may estimate the SS temperature 350 of the rear catalyst using equation (2) when the first and second freeze signals 412 and 416 are both in an inactive state.

A first freezing module 420 generates the first freeze signal 412 based on the tip-in and tip-out signals 364 and 372. In other words, the first freezing module 420 sets the first freeze signal 412 based on whether a tip-in event or a tip-out event is occurring. The first freezing module 420 sets the first freeze signal 412 to the active state when a tip-in event is occurring or when a tip-out event is occurring. The first freezing module 420 sets the first freeze signal 412 to the inactive state when neither a tip-in event is occurring nor a tip-out event is occurring. After transitioning the first freeze signal 412 from the inactive state to the active state, the first freezing module 420 maintains the first freeze signal 412 in the active state until a predetermined mass of exhaust gas has flowed into the rear catalyst.

An accumulation module 424 receives the tip-in and tip-out signals 364 and 372. The accumulation module 424 resets an accumulated mass 428 of exhaust gas that has flowed into the rear catalyst when a tip-in event or a tip-out event occurs. The accumulation module 424 resets the accumulated mass 428 to a predetermined reset value, such as zero.

The accumulation module 424 determines the accumulated mass 428 based on the EGF 346 of the rear catalyst. The accumulated mass 428 corresponds to a total mass of gas that has flowed into the rear catalyst since a last tip-in or tip-out event began. For example only, the accumulation module 424 may determine an amount of exhaust gas that flowed into the rear catalyst over a control loop based on an integral of the EGF 346 of the rear catalyst over the period. The accumulation module 424 may add the amount to a last value of the accumulated mass 428 to determine the accumulated mass 428.

The first freezing module 420 monitors the accumulated mass 428 and compares the accumulated mass 428 with the predetermined mass. The first freezing module 420 may transition the first freeze signal 412 from the active state to the inactive state when the accumulated mass 428 becomes greater than the predetermined mass.

A second freezing module 432 generates the second freeze signal 416 based on the FCO signal 378. In other words, the second freezing module 432 sets the second freeze signal 416 based on whether a FCO event is occurring. The second freezing module 432 sets the second freeze signal 416 to the active state when a FCO event is occurring. The second freezing module 432 sets the second freeze signal 416 to the inactive state when a FCO event is not occurring. After transitioning the second freeze signal 416 from the inactive state to the active state, the second freezing module 432 maintains the second freeze signal 416 in the active state until a counter value 436 is greater than a predetermined value.

A counter module 438 outputs the counter value 436. The counter module 438 resets the counter value 436 to a predetermined reset value, such as zero, when a FCO event occurs. The counter module 438 increments the counter value 436 once per control loop. In this manner, the counter value 436 tracks the number of control loops since a last FCO event occurred. Based on the knowledge of the length of each control loop and the counter value 436, the period of time since the FCO event began may be determined.

An offset determination module 440 selectively commands the SS temperature estimation module 404 to add an offset 444 to the SS temperature 350 of the rear catalyst for a FCO event. The SS temperature estimation module 404 adds the offset 444 to the SS temperature 350 of the rear catalyst before outputting the SS temperature 350 of the rear catalyst.

The offset determination module 440 may set the offset 444 based on the engine load conditions before the SS temperature 350 of the rear catalyst was frozen. More specifically, the offset determination module 440 may set the offset 444 based on whether high load conditions were present when an event began. The offset determination module 440 may set the offset 444 further based on whether the FCO event began during a tip-out event.

A high load detection module 448 indicates whether high load conditions are present based on the engine load. The EGF 346 of the first component of the exhaust system may be an indicator of the engine load. For example only, the high load detection module 448 may indicate that high load conditions are present when the EGF 346 of the first component is greater than a predetermined EGF. For example only, the predetermined EGF may be greater than 50%. The high load detection module 448 indicates whether high load conditions are present via a high load signal 452.

The offset determination module 440 determines when to apply the offset 444 based on the counter value 436 and/or the accumulated mass 428. For example, the offset determination module 440 sets the offset 444 equal to zero until the counter value 436 is greater than the predetermined value when the engine load conditions were not high and the FCO event did not begin during a tip-out event. Once the counter value 436 is greater than the predetermined value, the offset determination module 440 sets the offset 444 equal to a first predetermined offset. For example only, the first predetermined offset may be approximately 200° C. The setting of the offset 444 equal to the first predetermined offset may coincide with when the SS temperature 350 of the rear catalyst is unfrozen under the above circumstances.

When the engine load conditions were not high and the FCO event began during a tip-out event, the offset determination module 440 sets the offset 444 equal to zero for a predetermined period after the beginning of the FCO event.

Once the predetermined period has passed after the FCO event began, the offset determination module 440 sets the offset 444 equal to a second predetermined offset. For example only, the second predetermined offset may be approximately −50° C. The second predetermined offset is negative. The offset determination module 440 maintains the offset 444 at the second predetermined offset until the accumulated mass 428 is greater than the predetermined mass. Once the accumulated mass 428 is greater than the predetermined mass, the offset determination module 440 removes the second predetermined offset and sets the offset 444 equal to zero. The setting of the offset 444 equal to zero may coincide with when the SS temperature 350 of the rear catalyst is unfrozen under the above circumstances.

When the engine load conditions were high and the FCO event occurs during a tip-out event, the offset determination module 440 sets the offset 444 equal to zero until the accumulated mass 428 is greater than the predetermined mass. Once the accumulated mass 428 is greater than the predetermined mass, the offset determination module 440 sets the offset 444 equal to the first predetermined offset. The setting of the offset 444 equal to the first predetermined offset may coincide with when the SS temperature 350 of the rear catalyst is unfrozen under the above circumstances.

A mass temperature estimation module 460 of the mass temperature module 312 estimates the mass temperature 338 of the rear catalyst. The mass temperature estimation module 460 estimates the mass temperature 338 of the rear catalyst based on the SS temperature 350 of the rear catalyst, the last mass temperature 338 of the rear catalyst, and the mass coefficient 464. The mass temperature estimation module 460 may estimate the mass temperature 338 of the rear catalyst using equation (3), as described above.

A coefficient determination module 468 sets the mass coefficient 464 for determining the mass temperature 338 of the rear catalyst. The coefficient determination module 468 generally sets the mass coefficient 464 for the rear catalyst based on the EGF 346 of the rear catalyst. For example only, the coefficient determination module 468 may determine the mass coefficient 464 for the rear catalyst using a function and/or a mapping that relates the EGF 346 of the rear catalyst to the mass coefficient 464 for the rear catalyst.

The coefficient determination module 468 may selectively freeze or adjust the mass coefficient 464 for the rear catalyst under some circumstances. The coefficient determination module 468 selectively freezes the mass coefficient 464 when a third freeze signal 472 is generated. For example only, the coefficient determination module 468 freezes the mass coefficient 464 when the third freeze signal 472 is in an active state.

A coefficient freezing module 476 generates the third freeze signal 472 based on the tip-in and tip-out signals 364 and 372 and the high load signal 452. In other words, the coefficient freezing module 476 generates the third freeze signal 472 based on whether a tip-in or a tip-out event is occurring and based on whether the engine load conditions are high. The coefficient freezing module 476 sets the third freeze signal 472 to the active state when the engine load conditions are high when a tip-in event or a tip-out event begins.

After transitioning the third freeze signal 472 from the inactive state to the active state, the coefficient freezing module 476 maintains the third freeze signal 472 in the active state until a predetermined period has passed. In this manner, the coefficient determination module 468 will maintain the mass coefficient 464 for the rear catalyst for the predetermined period after a tip-in event or a tip-out event begins while the engine load conditions are high.

A timer module 480 resets a timer value 484 when a tip-in event or a tip-out event begins. The timer module 480 increases the timer value 484 as time passes. Accordingly, the timer value 484 corresponds to the period since the last tip-in event or tip-out event began. The coefficient freezing module 476 monitors the timer value 484 and transitions the third freeze signal 472 from the active state to the inactive state when the timer value 484 is greater than the predetermined period.

When the third freeze signal 472 transitions from the active state to the inactive state, the coefficient determination module 468 resumes determining the mass coefficient 464 for the rear catalyst based on the EGF 346 for the rear catalyst. However, the coefficient determination module 468 applies a first predetermined adjustment to the mass coefficient 464 before outputting the mass coefficient 464 until the accumulated mass is greater than the predetermined mass. For example only, the coefficient determination module 468 may multiply the mass coefficient 464 determined based on the EGF 346 for the rear catalyst by the first predetermined adjustment before outputting the mass coefficient 464. For example only, the first predetermined adjustment may be between approximately 0.001 and approximately 0.1.

When the accumulated mass becomes greater than the predetermined mass, the coefficient determination module 468 applies a second predetermined adjustment to the mass coefficient 464 before outputting the mass coefficient 464. For example only, the coefficient determination module 468 may multiply the mass coefficient 464 determined based on the EGF 346 for the rear catalyst by the second predetermined adjustment before outputting the mass coefficient 464. For example only, the second predetermined adjustment may also be between approximately 0.001 and approximately 0.1.

Figure 7:
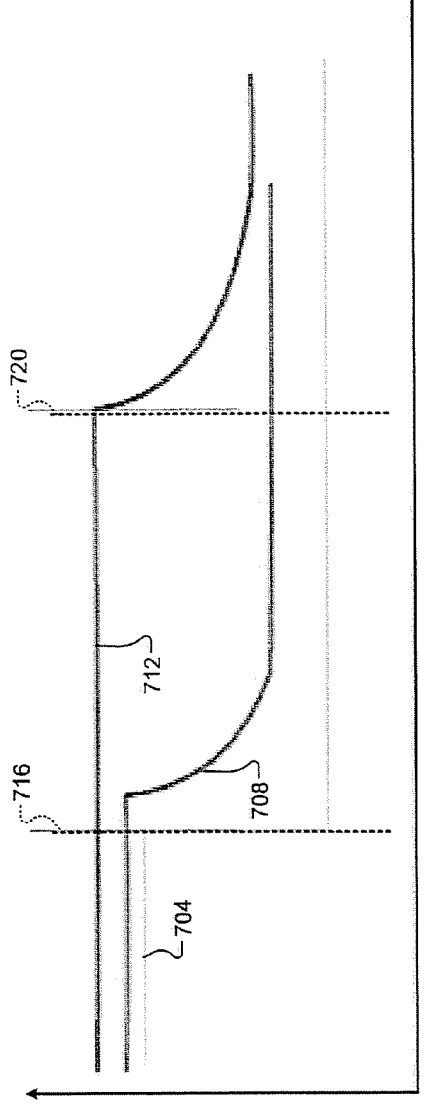
FIGS. 7-8 are example graphs of temperatures as functions of time during tip-out events according to the principles of the present disclosure.

FIGS. 5 and 7 include example graphs for a tip-in event and a tip-out event, respectively, that begins during steady-state engine load conditions. Traces 504 and 704 track the engine out temperature as a function of time. Traces 508 and 708 track a front catalyst temperature as a function of time. The front catalyst temperature may refer to the mass temperature 338 of a catalyst that is upstream of the rear catalyst, such as the first catalyst 218 or the fourth catalyst 260. Traces 512 and 712 track the mass temperature 338 of the rear catalyst as a function of time.

The engine out temperatures 504 and 704 being relatively constant before times 516 and 716, respectively, may be indicative of steady-state engine load conditions. The measurable increase and decrease in the engine out temperatures at times 516 and 716 are indicative of the occurrence of a tip-in event and a tip-out event, respectively.

Referring specifically to FIG. 5, when a tip-in event begins during steady-state conditions, the mass temperature 338 of the rear catalyst will first decrease or stay relatively constant after the tip-in event begins. Accordingly, the SS temperature estimation module 404 freezes the SS temperature 350 of the rear catalyst at time 516. As the mass temperature 338 of the rear catalyst may be approximately equal to the SS temperature 350 during steady-state engine load conditions, the trace 512 also remains steady after time 516. Second, the front catalyst temperature 508 begins to increase, and the front catalyst provides heat downstream and to the rear catalyst. Third, the mass temperature 338 of the rear catalyst will begin to increase.

The increase in the mass temperature 338 of the rear catalyst may be attributable in part to the heat provided by the front catalyst. The increase will begin once the accumulated mass 428 is greater than the predetermined mass, at approximately time 520. The SS temperature 350 of the rear catalyst is unfrozen when the accumulated mass 428 is greater than the predetermined mass. For a tip-in event, the SS temperature 350 increases when the accumulated mass 428 is greater than the predetermined mass. Accordingly, the mass temperature 338 of the rear catalyst increases toward the SS temperature 350 of the rear catalyst after time 520.

Referring specifically to FIG. 7, when a tip-out event begins during steady-state conditions, the mass temperature 338 of the rear catalyst will first increase or stay relatively constant after the tip-out event begins. Accordingly, the SS temperature estimation module 404 freezes the SS temperature 350 of the rear catalyst at time 716. As the mass temperature 338 of the rear catalyst may be approximately equal to the SS temperature 350 during steady-state engine load conditions, the trace 712 also remains steady after time 716. Second, the front catalyst temperature 708 begins to decrease. Third, the mass temperature 338 of the rear catalyst will begin to decrease.

The initial increase or maintenance of the mass temperature 338 of the rear catalyst after a tip-out event begins may be attributable to chemical reactions within one or more catalysts after the tip-out event begins. The later decrease in the mass temperature 338 of the rear catalyst may be attributable in part to the cooler engine out temperature 704, a decreasing amount of chemical reactions taking place, and/or convection between one or more of the catalysts and ambient air. The decrease will begin once the accumulated mass 428 is greater than the predetermined mass, at approximately time 720. The SS temperature 350 of the rear catalyst is unfrozen when the accumulated mass 428 is greater than the predetermined mass. For a tip-out event, the SS temperature 350 decreases when the accumulated mass 428 is greater than the predetermined mass. Accordingly, the mass temperature 338 of the rear catalyst decreases toward the SS temperature 350 of the rear catalyst after time 720.

Figure 8:
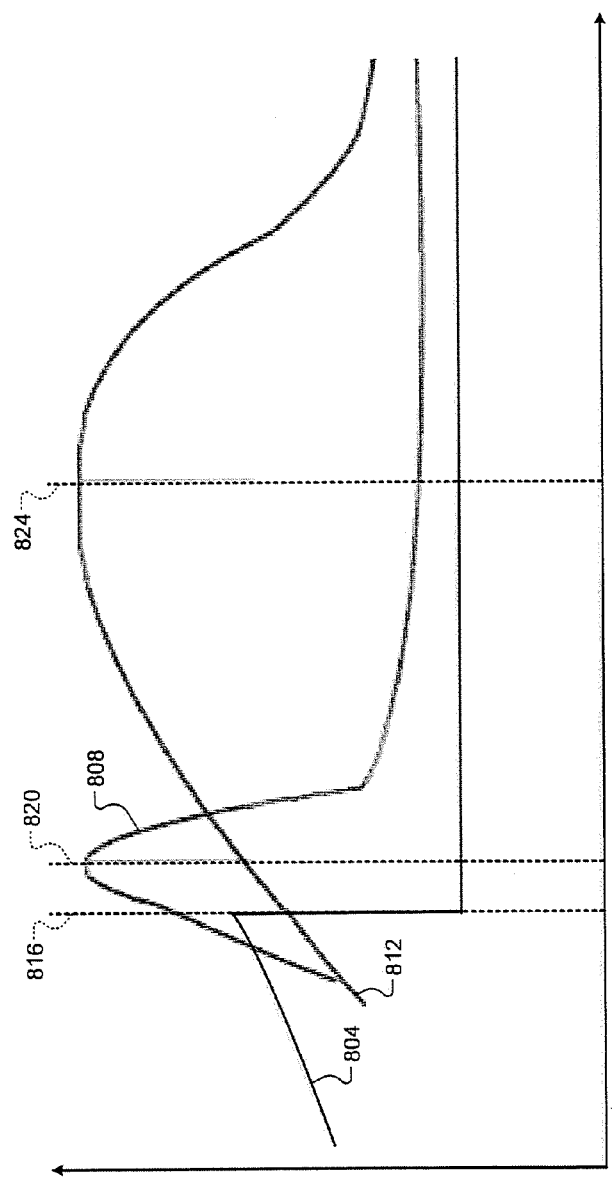

FIGS. 6 and 8 include example graphs for a tip-in event and a tip-out event, respectively, that begins during high load conditions. Traces 604 and 804 track engine out temperature as a function of time. Traces 608 and 808 track the front catalyst temperature as a function of time. Traces 612 and 812 track the mass temperature 338 of the rear catalyst as a function of time.

The engine out temperatures 604 and 804 being relatively high before times 616 and 816, respectively, may be indicative of high load conditions. The measurable increase and decrease in the engine out temperatures 604 and 804 at times 616 and 816 are indicative of the occurrence of a tip-in event and a tip-out event, respectively.

When the tip-in event or the tip-out event begins during high engine conditions, the mass coefficient 464 is frozen for the predetermined period. The predetermined period may end at approximately time 620 in FIG. 6 and at approximately time 820 in FIG. 8. The mass coefficient 464 is unfrozen at times 620 and 820. The mass coefficient 464 is adjusted based on the first predetermined adjustment between times 620 and 624 in FIG. 6 and between times 820 and 824 in FIG. 8. Adjusting the mass coefficient 464 adjusts the rate at which the mass temperature 338 of the rear catalyst can move toward the SS temperature 350 of the rear catalyst. At approximately times 624 and 824, the accumulated mass 428 becomes greater than the predetermined mass. Accordingly, the mass coefficient 464 is adjusted based on the second predetermined adjustment starting at times 624 and 824.

Figure 9:
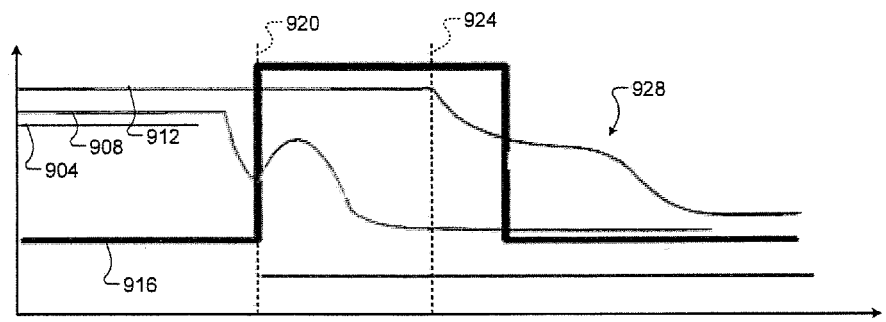
FIGS. 9-11 are example graphs of temperatures as functions of time during fuel cutoff (FCO) events according to the principles of the present disclosure.
Figure 10:
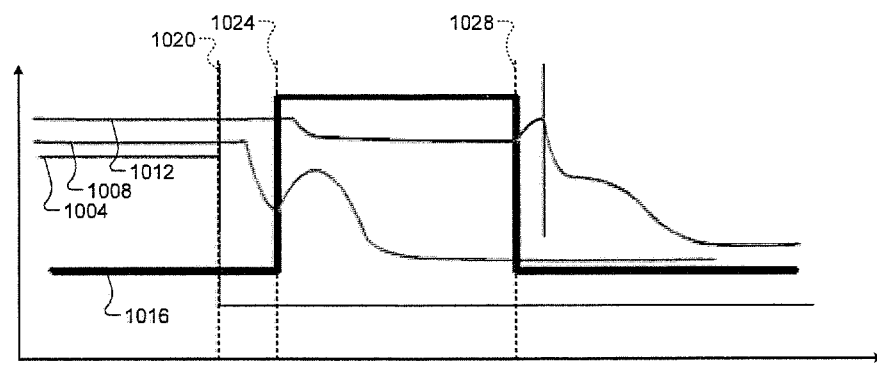
Figure 11:
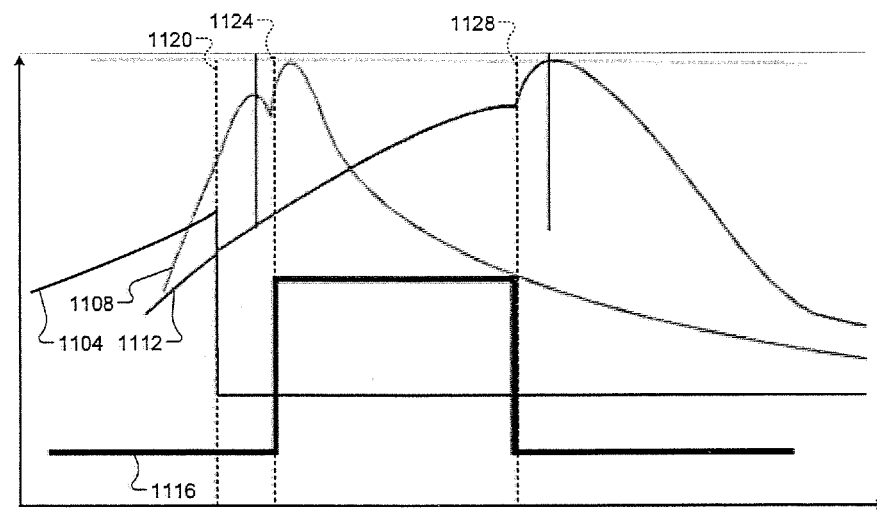

FIGS. 9-11 include example graphs for when FCO events occur. FIG. 9 includes an example graph for when a FCO event begins during steady-state engine load conditions. FIG. 10 includes an example graph for when a FCO event begins during a tip-out event that began during steady-state engine load conditions. FIG. 11 includes an example graph for when a FCO event begins during a tip-out event that began during high load conditions.

Referring specifically to FIG. 9, trace 904 tracks the engine out temperature as a function of time. Trace 908 tracks the front catalyst temperature as a function of time. Trace 912 tracks the mass temperature 338 of the rear catalyst as a function of time. Trace 916 tracks whether an FCO event is occurring. The engine out temperature decreases and the FCO event begins at time 920, as indicated by trace 916.

The front catalyst temperature increases shortly after the FCO event begins as indicated by the spike in the trace 908 after time 920. The SS temperature 350 of the rear temperature is frozen at time 920. Accordingly, the mass temperature 338 of the rear catalyst stays relatively constant after time 920 as indicated by the trace 912.

The SS temperature 350 of the rear catalyst is unfrozen the predetermined number of control loops (or predetermined period) after the FCO event begins. The predetermined number of control loops after the FCO event begins occurs at approximately time 924. However, the first predetermined offset is added to the SS temperature 350 of the starting at time 924. For example only, the first predetermined offset may be approximately 200° C. The addition of the offset slows the rate at which the mass temperature 338 of the rear catalyst decreases after time 924. The spike in the mass temperature 338 of the rear catalyst indicated at 928 may be attributable to propagation of the heat from the spike in the front catalyst temperature. Similar spikes in the mass temperature 338 of the rear catalyst are exhibited in the mass temperature 338 of the rear catalyst traces of FIGS. 10 and 11.

Referring specifically to FIG. 10, trace 1004 tracks the engine out temperature as a function of time. Trace 1008 tracks the front catalyst temperature as a function of time. Trace 1012 tracks the mass temperature 338 of the rear catalyst as a function of time. Trace 1016 tracks whether an FCO event is occurring. A tip-out event begins at approximately time 1020 when the engine load conditions are in steady-state. A FCO event begins at time 1024.

The SS temperature 350 of the rear temperature is frozen at time 1020, when the tip-out event begins. Accordingly, the mass temperature 338 of the rear catalyst stays relatively constant after time 1020 as indicated by the trace 1012. The front catalyst temperature increases shortly after the FCO event occurs as indicated by the spike in the trace 1008 after time 1024.

Once the predetermined period has passed after time 1024 (i.e., when the FCO event began), the offset determination module 440 adds the second predetermined offset to the SS temperature 350 of the rear catalyst. For example only, the second predetermined offset may be approximately −50° C. The addition of the second predetermined offset (which is negative) to the SS temperature 350 of the rear catalyst decreases the SS temperature 350. The mass temperature 338 of the rear catalyst follows the SS temperature 350 as indicated by the trace 1012 after time 1024.

The second predetermined offset is added to the SS temperature 350 of the rear catalyst until the accumulated mass 428 is greater than the predetermined mass. The accumulated mass 428 becomes greater than the predetermined mass at approximately time 1028. Once the accumulated mass 428 is greater than the predetermined mass, the offset determination module 440 removes the second predetermined offset, and the SS temperature 350 of the rear catalyst is unfrozen.

Referring specifically to FIG. 11, trace 1104 tracks the engine out temperature as a function of time. Trace 1108 tracks the front catalyst temperature as a function of time. Trace 1112 tracks the mass temperature 338 of the rear catalyst as a function of time. Trace 1116 tracks whether an FCO event is occurring. A tip-out event begins at approximately time 1120 when the load conditions are high. A FCO event begins at time 1124.

The SS temperature 350 of the rear catalyst is frozen at time 1120 when the tip-out event begins. As the load conditions are high when the tip-out event begins, the temperature at which the SS temperature 350 is frozen is higher than the mass temperature 338 of the rear catalyst. Accordingly, the mass temperature 338 continues to increase toward the SS temperature after time 1120 as illustrated by the trace 1112.

The SS temperature 350 of the rear catalyst is frozen until the accumulated mass 428 is greater than the predetermined mass. The accumulated mass 428 becomes greater than the predetermined mass at approximately time 1128. The SS temperature 350 of the rear catalyst is therefore unfrozen at approximately time 1128. The first predetermined offset is added to the SS temperature 350 once the accumulated mass 428 is greater than the predetermined mass. Accordingly, the mass temperature 338 of the rear catalyst continues to increase after time 1128 based on the SS temperature 350 of the rear catalyst (with the first predetermined offset added) being greater than the mass temperature 338 of the rear catalyst.

Figure 12:
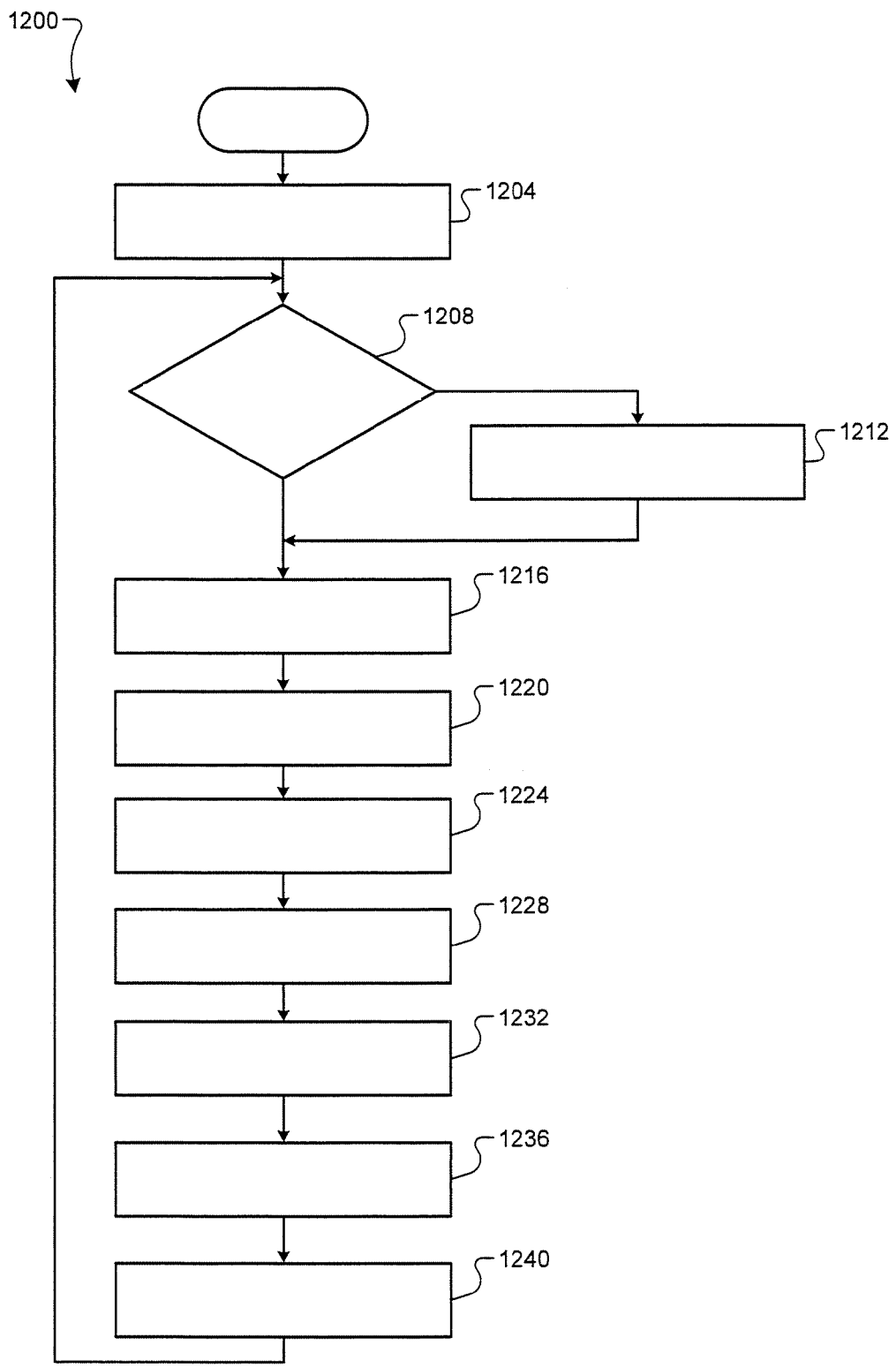
FIG. 12 is a flowchart depicting an example method of determining exhaust gas flowrate, input gas temperature, instantaneous temperature, and output gas temperature for components of an exhaust system according to the principles of the present disclosure.

Referring now to FIG. 12, a flowchart depicting an example method 1200 is presented. Control initializes in step 1204. For example only, control may reset previously stored values, reset a component counter value (N) to a predetermined reset value, re-configure based on the actual configuration of the exhaust system of the vehicle, and/or perform one or more other actions at 1204. The predetermined reset value may be set to, for example only, zero.

At 1208, control determines whether the counter value is greater than a predetermined value (M). If true, control resets the counter value at 1212 to the predetermined reset value at 1212 and continues to 1216. If false, control continues to 1216. In the example of FIG. 12, the predetermined value (i.e., M) corresponds to the total number of components included in the exhaust system of the vehicle.

Control increments the counter value at 1216 and proceeds to 1220. Control estimates the EGF 346 for the N-th component of the exhaust system at 1220. For example only, an N value equal to one may correspond to an associated exhaust manifold and an N value equal to M may correspond to an associated muffler/tailpipe system.

Control estimates the input temperature 330 for the N-th component at 1224. The input temperature 330 corresponds to the temperature of gas entering the N-th component. Control estimates the SS temperature 350 for the N-th component in step 1228. The SS temperature 350 corresponds to the temperature that the material of the N-th component will likely reach if the engine load conditions remain steady-state for a predetermined period.

At 1232, control estimates the mass temperature 338 for the N-th component. The mass temperature 338 corresponds to the instantaneous temperature of the material of the component. Control estimates the output temperature 334 for the N-th component at 1236. The output temperature 334 corresponds to the temperature of gas output from the N-th component. Control stores the temperatures at 1240, and control returns to 1208. Control may store the temperatures, for example, in the storage module 305 indexed by the N-th component. One iteration of 1208-1240 may be illustrative of one example control loop for the N-th component. Control may perform 1208-1240 for each component during each control loop.

Figure 13:
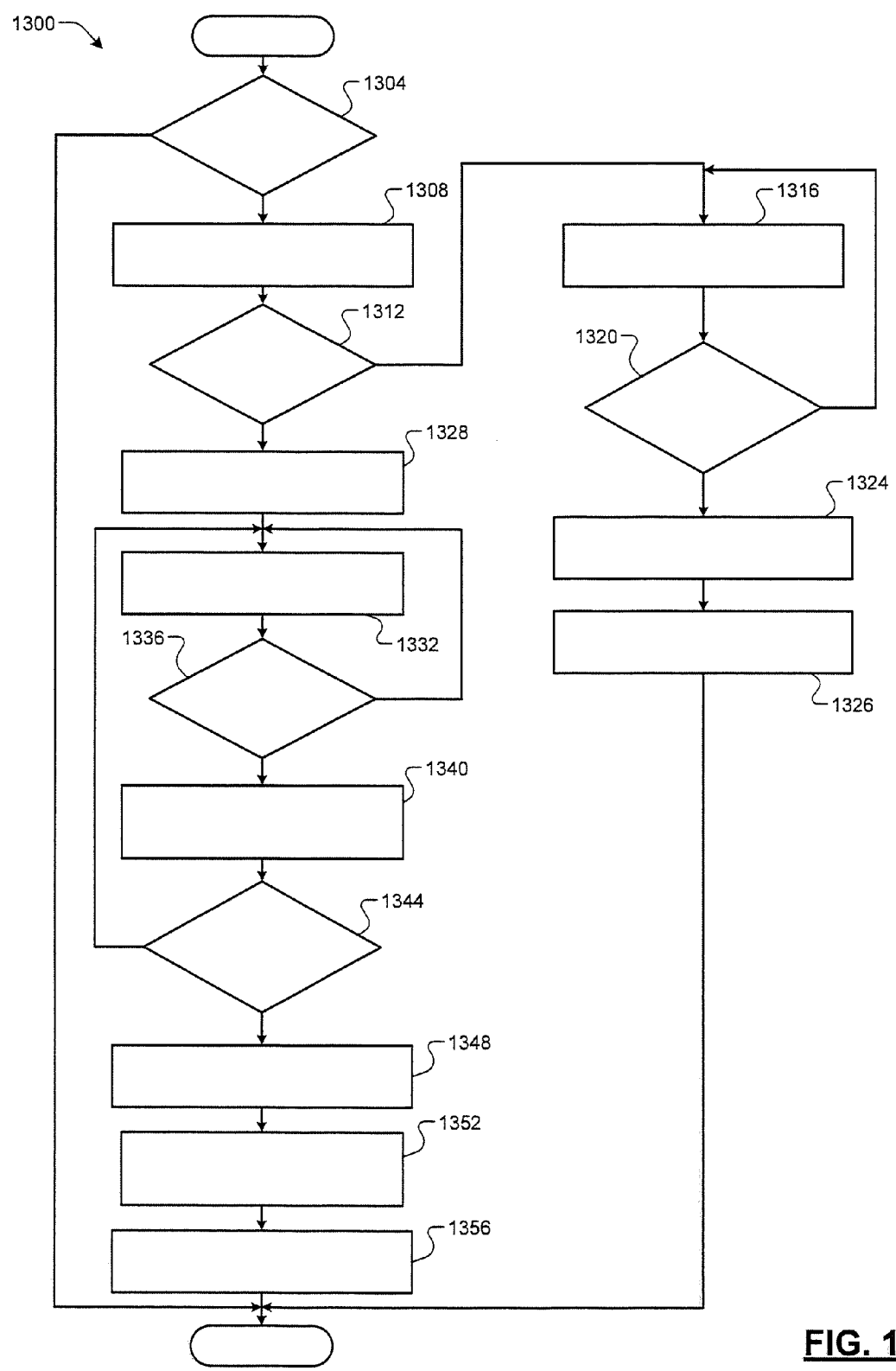
FIG. 13 is a flowchart depicting an example method of estimating instantaneous and steady-state temperatures of a downstream-most catalyst during tip-in events and tip-out events according to the principles of the present disclosure.

Referring now to FIG. 13, a flowchart depicting an example method 1300 of determining the SS temperature 350 and the mass temperature 338 of the rear catalyst for tip-in events and tip-out events is presented. Control begins at 1304 and determines whether a tip-in event or a tip-out event is occurring. If true, control proceeds to 1308; if false, control may end.

At 1308, control freezes the SS temperature 350 of the rear catalyst and resets the accumulated mass 428 of exhaust gas that has flowed into (or through) the rear catalyst. Control determines whether the occurring event began during high load conditions at 1312. If true, control proceeds to 1328, which is discussed further below. If false, control proceeds to 1316. Control determines the accumulated mass 428 at 1316 and continues with 1320.

Control determines whether the accumulated mass 1320 is greater than the predetermined mass at 1320. If true, control unfreezes the SS temperature 350 of the rear catalyst and determines the SS temperature 350 of the rear catalyst based on equation (2) at 1324. Control determines the mass temperature 338 of the rear catalyst based on equation (3) at 1326. Control may then end.

Referring back to 1328 (i.e., when the occurring event did begin during high load conditions at 1312), the occurring event may be deemed to have begun during steady-state load conditions. Control freezes the mass coefficient and resets the timer value 484 at 1328. Control determines the accumulated mass 428 at 1332. Control determines whether the timer value 484 is greater than the predetermined period at 1336. If true, control proceeds with 1340; if false, control returns to 1332.

At 1340, control unfreezes the mass coefficient 464 and applies the first predetermined adjustment to the mass coefficient 464. Control determines whether the accumulated mass 428 is greater than the predetermined mass at 1344. If true, control continues with 1348; if false, control returns to 1336. At 1348, control unfreezes the SS temperature 350 of the rear catalyst and determines the SS temperature 350 of the rear catalyst based on equation (2). While control is shown and described as returning at 1320, 1344, and 1336, control actually maintains the SS temperature 350 of the rear catalyst (as the SS temperature 350 was frozen at 1308) and determines the mass temperature 338 of the rear catalyst based on the SS temperature 350 before returning.

Control removes the application of the first predetermined adjustment and applies the second predetermined adjustment to the mass coefficient 464 at 1352. Control determines the mass temperature 338 of the rear catalyst at 1356 based on equation (3). Control may then end or, for example, return to 1304.

Figure 14:
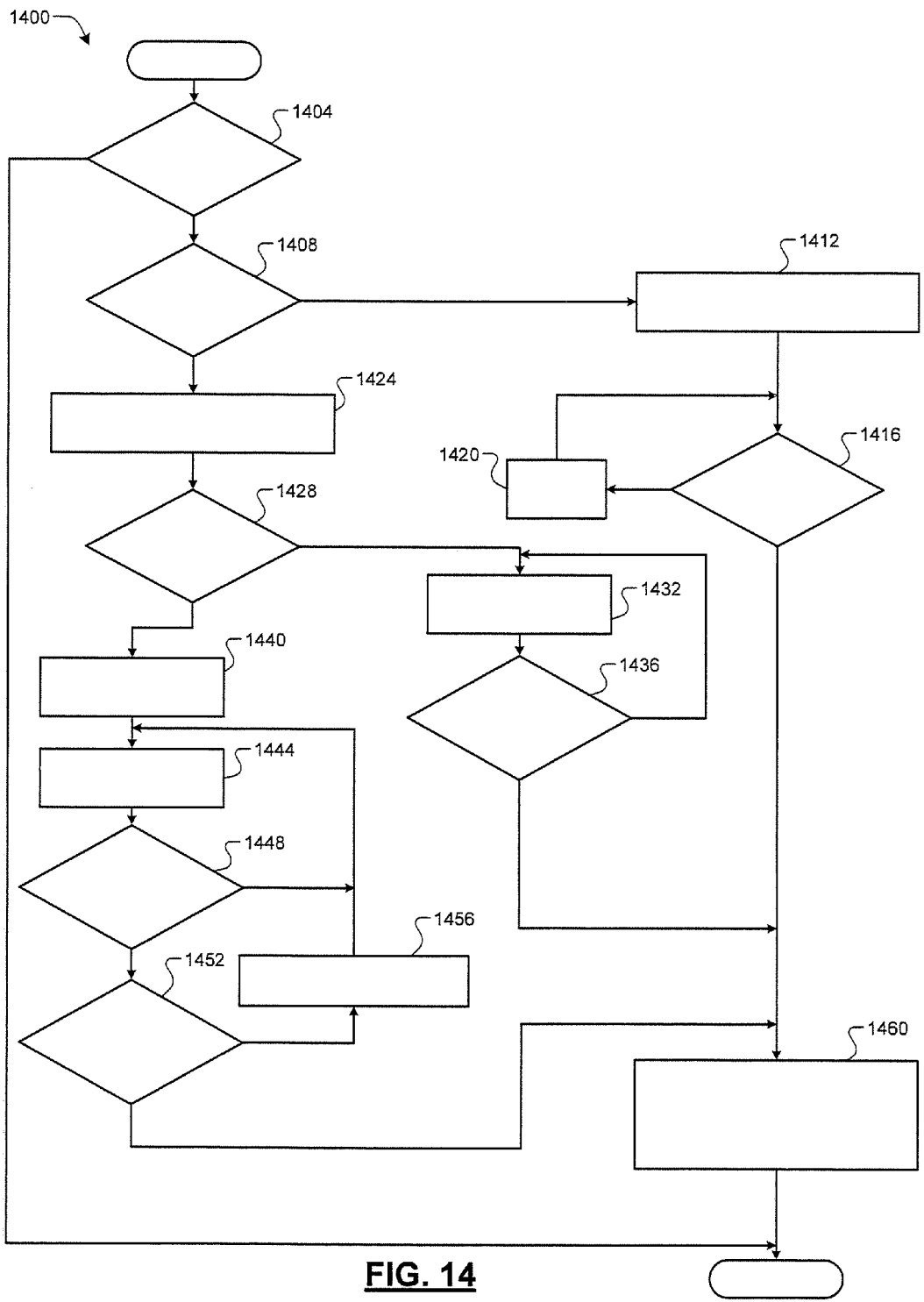
FIG. 14 is a flowchart depicting an example method of estimating the instantaneous and steady-state temperatures of the downstream-most catalyst during fuel cut off (FCO) events according to the principles of the present disclosure.

Referring now to FIG. 14, a flowchart depicting an example method 1400 of determining the SS temperature 350 and the mass temperature 338 of the rear catalyst for FCO events is presented. Control begins at 1404 where control determines whether an FCO event is occurring. If true, control proceeds to 1408; if false, control may end.

Control determines whether the FCO event began during a tip-out event at 1408. If false, control proceeds to 1412. If true, control proceeds to 1424, which is discussed further below. At 1412, control freezes the SS temperature 350 of the rear catalyst and resets the counter value 436. Control determines whether the counter value 436 is greater than the predetermined value at 1416. If true, control proceeds to 1460, which is discussed further below. If false, control increments the counter value 436 at 1420 and returns to 1416.

Referring back to 1424 (i.e., when the FCO event begins during a tip-out event at 1408), control freezes the SS temperature 350 of the rear catalyst and resets the accumulated mass 428 at 1428. Control determines whether the load conditions were high when the tip-out event began at 1428. If true, control continues with 1432. If false, control continues with 1440, which is discussed further below. Control determines the accumulated mass 428 at 1432, and control determines whether the accumulated mass 428 is greater than the predetermined mass at 1436. If true, control continues to 1460, which is discussed further below. If false, control returns to 1432.

Referring back to 1440 (i.e., when the load conditions were not high when the tip-out event began), control resets the timer value 484. Control determines the accumulated mass 428 at 144, and control determines whether the timer value 484 is greater than the predetermined period at 1448. If true, control continues to 1452; if false, control returns to 1444.

At 1452, control determines whether the accumulated mass 428 is greater than the predetermined mass. If false, control adds the second predetermined offset to the SS temperature 350 of the rear catalyst at 1456 and returns to 1444. If true, control proceeds to 1460. In this manner, control removes the second predetermined offset once the accumulated mass 428 is greater than the predetermined mass. While control is shown and described as returning from 1416, 1436, 1448, or 1452, control actually maintains the SS temperature 350 of the rear catalyst (as the SS temperature 350 was frozen at 1308) before returning. Control may also add an offset (e.g., at 1456) to the SS temperature 350 of the rear catalyst before returning. Control also determines the mass temperature 338 of the rear catalyst based on the SS temperature 350 before returning.

At 1460, control unfreezes the SS temperature 350 of the rear catalyst. Control also determines the SS temperature 350 of the rear catalyst based on equation (2) and adds the first predetermined offset to the SS temperature 350 of the rear catalyst at 1460. Control also determines the mass temperature 338 of the rear catalyst based on equation (3) at 1460. Control may then end or, for example, return to 1404.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a vehicle, comprising:
a first electronic circuit that generates a steady-state (SS) temperature of a downstream-most catalyst of an exhaust system;
a second electronic circuit that indicates when a tip-in event occurs;
a third electronic circuit that indicates when a tip-out event occurs,
wherein the first electronic circuit selectively maintains the SS temperature after one of the tip-in event and the tip-out event begins;
a fourth electronic circuit that determines a mass coefficient as a function of an exhaust flow rate into the downstream-most catalyst,
wherein the fourth electronic circuit selectively maintains the mass coefficient after the one of the tip-in event and the tip-out event begins; and
a fifth electronic circuit that generates an instantaneous temperature of the downstream-most catalyst as a function of the SS temperature, a previous value of the instantaneous temperature, and the mass coefficient.

2. The system of claim 1 further comprising a sixth electronic circuit that determines an accumulated mass of exhaust gas that has flowed into the downstream-most catalyst since the one of the tip-in event and the tip-out event began,
wherein the first electronic circuit maintains the SS temperature until the accumulated mass is greater than a predetermined mass.

3. The system of claim 2 wherein, when the accumulated mass is greater than the predetermined mass, the first electronic circuit generates the SS temperature as a function of a temperature of gas input to the downstream-most catalyst, an ambient temperature, and a SS coefficient determined based on an exhaust flow rate into the downstream-most catalyst.

4. The system of claim 1 wherein the fourth electronic circuit maintains the mass coefficient for a predetermined period after the one of the tip-in event and the tip-out event begins.

5. The system of claim 4 further comprising a sixth electronic circuit that determines an accumulated mass of exhaust gas that has flowed into the downstream-most catalyst since the one of the tip-in event and the tip-out event began,
wherein, after the predetermined period, the fourth electronic circuit (I) determines the mass coefficient as a function of the exhaust flow rate into the downstream-most catalyst, (II) adjusts the mass coefficient based on a first predetermined adjustment before the accumulated mass is greater than a predetermined mass, and (III) adjusts the mass coefficient based on a second predetermined adjustment after the accumulated mass is greater than the predetermined mass.

6. The system of claim 1 further comprising a seventh electronic circuit that indicates whether a high load condition is present based on an engine load parameter,
wherein the fourth electronic circuit maintains the mass coefficient after the one of the tip-in event and the tip-out event begins when the high load condition was present when the one of the tip-in event and the tip-out event began.

7. The system of claim 1 further comprising an eighth electronic circuit that indicates when fuel to an engine of the vehicle is cut off,
wherein the first electronic circuit selectively maintains the SS temperature after the fuel to the engine is cut off.

8. The system of claim 7 wherein the first electronic circuit (I) maintains the SS temperature for a predetermined period after the fuel to the engine is cut off, (II) after the predetermined period, generates the SS temperature as a function of a temperature of gas input to the downstream-most catalyst, an ambient temperature, and a SS coefficient determined based on an exhaust flow rate into the downstream-most catalyst, and (III) adds a predetermined offset to the SS temperature after the predetermined period.

9. The system of claim 1 wherein the first, second, third, fourth, and fifth electronic circuits include at least one of an Application Specific Integrated Circuit (ASIC), a field programmable gate array (FPGA), a processor, and a combinational logic circuit.

10. A system for a vehicle, comprising:
a first electronic circuit that generates a steady-state (SS) temperature of a downstream-most catalyst of an exhaust system at a predetermined location between upstream and downstream faces of the downstream-most catalyst,
wherein the predetermined location is a predetermined distance upstream from the downstream face;

a second electronic circuit that indicates when a tip-in event occurs;

a third electronic circuit that indicates when a tip-out event occurs, wherein the first electronic circuit selectively maintains the SS temperature after one of the tip-in event and the tip-out event begins;

a fourth electronic circuit that determines a mass coefficient as a function of an exhaust flow rate into the downstream-most catalyst, wherein the fourth electronic circuit selectively maintains the mass coefficient after the one of the tip-in event and the tip-out event begins; and a fifth electronic circuit that generates an instantaneous temperature of the downstream-most catalyst at the predetermined location as a function of the SS temperature, a previous value of the instantaneous temperature, and the mass coefficient.

11. The system of claim 10 wherein the first, second, third, fourth, and fifth electronic circuits include at least one of an Application Specific Integrated Circuit (ASIC), a field programmable gate array (FPGA), a processor, and a combinational logic circuit.

12. A method for a vehicle, performed by an electronic control unit, the method, comprising:
generating a steady-state (SS) temperature of a downstream-most catalyst of an exhaust system;
indicating when a tip-in event occurs;
indicating when a tip-out event occurs;
selectively maintaining the SS temperature after one of the tip-in event and the tip-out event begins;
determining a mass coefficient as a function of an exhaust flow rate into the downstream-most catalyst;
selectively maintaining the mass coefficient after the one of the tip-in event and the tip-out event begins; and
generating an instantaneous temperature of the downstream-most catalyst as a function of the SS temperature, a previous value of the instantaneous temperature, and the mass coefficient.

13. The method of claim 12 further comprising:
determining an accumulated mass of exhaust gas that has flowed into the downstream-most catalyst since the one of the tip-in event and the tip-out event began; and
maintaining the SS temperature until the accumulated mass is greater than a predetermined mass.

14. The method of claim 13 further comprising, when the accumulated mass is greater than the predetermined mass, generating the SS temperature as a function of a temperature of gas input to the downstream-most catalyst, an ambient temperature, and a SS coefficient determined based on an exhaust flow rate into the downstream-most catalyst.

15. The method of claim 12, further comprising maintaining the mass coefficient for a predetermined period after the one of the tip-in event and the tip-out event begins.

16. The method of claim 15 further comprising:
determining an accumulated mass of exhaust gas that has flowed into the downstream-most catalyst since the one of the tip-in event and the tip-out event began; and,
after the predetermined period:
determining the mass coefficient as a function of the exhaust flow rate into the downstream-most catalyst;
adjusting the mass coefficient based on a first predetermined adjustment before the accumulated mass is greater than a predetermined mass; and
adjusting the mass coefficient based on a second predetermined adjustment after the accumulated mass is greater than the predetermined mass.

17. The method of claim 12 further comprising:
indicating whether a high load condition is present based on an engine load parameter; and
maintaining the mass coefficient after the one of the tip-in event and the tip-out event begins when the high load condition was present when the one of the tip-in event and the tip-out event began.

18. The method of claim 12 further comprising:
indicating when fuel to an engine of the vehicle is cut off; and
selectively maintaining the SS temperature after the fuel to the engine is cut off.

19. The method of claim 18 further comprising:
maintaining the SS temperature for a predetermined period after the fuel to the engine is cut off;
after the predetermined period, generating the SS temperature as a function of a temperature of gas input to the downstream-most catalyst, an ambient temperature, and a SS coefficient determined based on an exhaust flow rate into the downstream-most catalyst; and
adding a predetermined offset to the SS temperature after the predetermined period.

20. A method for a vehicle, performed by an electronic control unit, the method, comprising:
generating a steady-state (SS) temperature of a downstream-most catalyst of an exhaust system at a predetermined location between upstream and downstream faces of the downstream-most catalyst,
wherein the predetermined location is a predetermined distance upstream from the downstream face;
indicating when a tip-in event occurs;
indicating when a tip-out event occurs;
selectively maintaining the SS temperature after one of the tip-in event and the tip-out event begins;
determining a mass coefficient as a function of an exhaust flow rate into the downstream-most catalyst;
selectively maintaining the mass coefficient after the one of the tip-in event and the tip-out event begins; and
generating an instantaneous temperature of the downstream-most catalyst at the predetermined location as a function of the SS temperature, a previous value of the instantaneous temperature, and the mass coefficient.

* * * * *